United States Patent
Chien et al.

(10) Patent No.: US 9,883,203 B2
(45) Date of Patent: Jan. 30, 2018

(54) ADAPTIVE OVERLAPPED BLOCK MOTION COMPENSATION

(71) Applicant: QUALCOMM Incorporated, San Diego, CA (US)

(72) Inventors: Wei-Jung Chien, San Diego, CA (US); In Suk Chong, San Diego, CA (US); Liwei Guo, San Diego, CA (US); Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 663 days.

(21) Appl. No.: 13/678,329

(22) Filed: Nov. 15, 2012

(65) Prior Publication Data

US 2013/0128974 A1 May 23, 2013

Related U.S. Application Data

(60) Provisional application No. 61/561,783, filed on Nov. 18, 2011.

(51) Int. Cl.
*H04N 19/583* (2014.01)
*H04N 19/105* (2014.01)
(Continued)

(52) U.S. Cl.
CPC ......... *H04N 19/583* (2014.11); *H04N 19/105* (2014.11); *H04N 19/136* (2014.11);
(Continued)

(58) Field of Classification Search
CPC ........... H04N 19/00903; H04N 19/105; H04N 19/139; H04N 19/176; H04N 19/577;
(Continued)

(56) References Cited

U.S. PATENT DOCUMENTS

| 5,764,805 A | 6/1998 | Martucci et al. |
| 7,653,133 B2 | 1/2010 | Woods et al. |

(Continued)

FOREIGN PATENT DOCUMENTS

| CN | 1574963 A | 2/2005 |
| CN | 1926868 A | 3/2007 |

OTHER PUBLICATIONS

Vinh et al. ("Frame Rate Up-Conversion Using Forward-Backward Jointing Motion Estimation and Spatio-Temporal Motion Vector Smoothing" 2009, IEEE).*

(Continued)

*Primary Examiner* — Mohammed Jebari

(57) ABSTRACT

In general, techniques are described for performing adaptive overlapped block motion compensation when coding video data. A video coding device configured to code video data may implement the techniques. The video coding device may comprise one or more processors configured to determine an adaptation metric from a region of support for one of a first partition and a second partition of one or more blocks of the video data separated by a partition boundary. The region of support may not be the entire one or more blocks of video data. The one or more processors may further be configured to adapt, based on the adaptation metric, application of an overlapped block motion compensation process to determine predicted pixel values near the partition boundary for a first predicted block representative of the first partition of the video block.

46 Claims, 7 Drawing Sheets

(51) Int. Cl.

| | |
|---|---|
| *H04N 19/139* | (2014.01) |
| *H04N 19/176* | (2014.01) |
| *H04N 19/136* | (2014.01) |
| *H04N 19/17* | (2014.01) |
| *H04N 19/523* | (2014.01) |
| *H04N 19/85* | (2014.01) |
| *H04N 19/577* | (2014.01) |

(52) U.S. Cl.
CPC .......... *H04N 19/139* (2014.11); *H04N 19/17* (2014.11); *H04N 19/176* (2014.11); *H04N 19/523* (2014.11); *H04N 19/577* (2014.11); *H04N 19/85* (2014.11)

(58) Field of Classification Search
CPC ...... H04N 19/17; H04N 19/523; H04N 19/85; H04N 19/583; H04N 19/136
See application file for complete search history.

(56) References Cited

U.S. PATENT DOCUMENTS

| 8,041,134 | B2 | 10/2011 | Lee et al. | |
|---|---|---|---|---|
| 9,071,851 | B2* | 6/2015 | Guo et al. | |
| 2006/0008038 | A1* | 1/2006 | Song et al. | 375/350 |
| 2006/0039481 | A1* | 2/2006 | Shen | H04N 5/45 375/240.25 |
| 2008/0165858 | A1* | 7/2008 | Karczewicz | H04N 19/176 375/240.23 |
| 2008/0247462 | A1* | 10/2008 | Demos | 375/240.03 |
| 2010/0040146 | A1* | 2/2010 | Wang et al. | 375/240.16 |
| 2011/0007803 | A1 | 1/2011 | Karczewicz et al. | |
| 2011/0200098 | A1 | 8/2011 | Kim et al. | |
| 2011/0206114 | A1 | 8/2011 | Kim et al. | |
| 2011/0235704 | A1 | 9/2011 | Kim et al. | |
| 2012/0177120 | A1* | 7/2012 | Guo et al. | 375/240.16 |
| 2013/0182780 | A1* | 7/2013 | Alshin | H04N 19/80 375/240.29 |

OTHER PUBLICATIONS

Lee at al. ("Weighted-Adaptive Motion-Compensated Frame Rate Up-Conversion" Jun. 15, 2003, IEEE).*
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011,193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 2011, JCTVC-G1103_d2, 214 pp.
Chen et al., "Implementation of Multiple Macroblock Mode Overlapped Block Motion Compensation for Wavelet Video Coding," Circuits Systems Signal Processing, vol. 26, No. 1, 2007, pp. 55-67.
Choi et al., "Motion-Compensated Frame Interpolation Using Bilateral Motion Estimation and Adaptive Overlapped Block Motion Compensation," IEEE Transactions on Circuits and Systems for Video Technology, vol. 17, No. 4, Apr. 2007, pp. 407-416.
Guo L., et al., "CE2: Overlapped Block Motion Compensation", 7. JCT-VC Meeting, 98 MPEG Meeting, Nov. 21, 2011-Nov. 30, 2011, Geneva, Joint Collaborative Team on Video Coding of ISO/IEC JTC1/SC29/WG11 and ITU-T SG.16, URL: http://wftp3.itu.int/av-arch/jctvc-site/no. JCTVC-G749, Nov. 9, 2011, XP030110733.
Guo L., et al., "CE2: Overlapped Block Motion Compensation", 98, MPEG Meeting; Nov. 28, 2011-Dec. 2, 2011; Geneva; (Motion Picture Expert Group of ISO/IEC JTC1/SC29/WG11),, No. m22319, Nov. 18, 2011 (Nov. 18, 2011), XP030050882.
International Search Report and Written Opinion—PCT/US2012/065653—ISA/EPO—Jan. 31, 2013, 18 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Karczewicz et al., "Video coding technology proposal by Qualcomm Inc.," JCTVC-A121, 1st Meeting: Dresden, DE, Apr. 15-23, 2010, 24 pages.
Kuo et al., "A hybrid BMC/OBMC motion compensation scheme," Proceedings/International Conference on Image Processing: October 26-29, 1997, Santa Barbara, California, pp. 795-798.
Orchard et al., "Overlapped Block Motion Compensation: An Estimation-Theoretic Approach," IEEE Transactions on Image Processing, vol. 3, No. 5, Sep. 3, 1994, pp. 693-699.
Sullivan, "Methods of reduced-complexity overlapped block motion compensation," Proceedings of the International Conference on Image Processing (ICIP) Austin, Texas, 1994, vol. 2, pp. 957-961.
Wang et al., "Coding mode adapted overlapped block motion compensation in H.264", IMACS Multiconference on "Computational Engineering in Systems Applications," Oct. 4-6, 2006, Beijing, China, 4 pp.
Bross et al., "High efficiency video coding (HEVC) text specification draft 6," 7th Meeting: Geneva, CH, Nov. 21-30, 2011, JCTVC-H1003, 259 pp.
Bross et al., "High efficiency video coding (HEVC) text specification draft 7," 9th Meeting: Geneva, CH, Apr. 27-May 7, 2012, JCTVC-I1003_d21, 290 pp.
Bross et al., "High efficiency video coding (HEVC) text specification draft 8," 10th Meeting: Stockholm, SE, Jul. 11-20, 2012, JCTVC-J1003_d7, 261 pp.
International Preliminary Report on Patentability—PCT/US2012/065653—The International Bureau of WIPO Geneva, Switzerland, Feb. 26, 2014, 11pp.
ITU-T H.265, Series H: Audiovisual and Multimedia Systems, Infrastructure of audiovisual services—Coding of moving video, High efficiency video coding, The International Telecommunication Union, Apr. 2013, 317 pp.
Bross et al., "High efficiency video coding (HEVC) text specification draft 6," 8th Meeting: San Jose, CA, USA, Feb. 1-10, 2012, JCTVC-H1003, 259 pp.
Reply to Written Opinion dated Jan. 31, 2013, from international application No. PCT/US2012/065653, dated May 22, 2013, 55 pp.
Second Written Opinion of international application No. PCT/2012/065653, dated Nov. 11, 2013, 11 pp.
Reply to Written Opinion dated Nov. 11, 2013, from international application No. PCT/US2012/065653, dated Jan. 10, 2014, 46 pp.
Nakajima M., et al., "Overlapped Block Motion Compensation from Multiple Frames Using Adaptive Interpolation Filters," ITE Technical Report, vol. 32, No. 56, The Institute of Image Information and Television Engineers (ITE), Dec. 11, 2008, pp. 59-64, ISSN:1342 6893. (English abstract only).
Suganuma, et al., "A Study on Overlapped Motion Compensation Based on Variable-Size Blocks," Proceedings of the 1998 IEICE General Conference, Separate vol. Information and Systems 2, The Institute of Electronics, Information and Communication Engineers (IEICE), Mar. 30, 1998, p. 51. [translation of cited portion included].
Bossen, "Common Test Conditions and Software Reference Configurations," Joint Collaborative Team on Video Coding (JCT-VC) of ITU-T SG16 WP3 and ISO/IEC JTC1/SC29/WG11, 4th Meeting: Daegu, KR, Jan. 20-28, 2011, JCTVC-E700, WG11 No. m20235, Apr. 25, 2011, 11 pp.
Bossen, "Common test conditions and software reference configurations," ITU-T SG16 WP3 and ISO/IEC JTC1/SC29/WG11, 6th Meeting: Torino, IT, Jul. 14-22, 2011, JCTVC-F900, m21452, Aug. 15, 2011, 3 pp.
Guo et al., "CE2: Overlapped Block Motion Compensation for 2NxN and Nx2N Motion Partitions," MPEG Meeting; Jul. 14-22,

(56) References Cited

OTHER PUBLICATIONS

2011; Torino; (Motion Picture Expert Group or ISO/IEC JTC1/SC29/WG11), No. m20720, JCTVC-F299, XP030049283, Jul. 15, 2011, 7 pp.

Guo, et.al., "CE2: Overlapped Block Motion Compensation," 7th Meeting, Geneva, CH, Nov. 21-30, 2011; Joint Collaborative Team on Video Coding (JCT-VC) of ITU-T SG16 WP3 and ISO/IEC JTC1/SC29/WG11, Nov. 13, 2011, 8 pp., Document: JCTVC-G749, Version 2, URL: http://phenix.it-sudparis.eu/jct/doc_end_user/documents/7_Geneva/wg11/JCTVC-G749-v2.zip.

Zhai, et.al., "Motion-Compensated Wavelet Video Coding Using Adaptive Mode Selection", Proc. SPIE Visual communications and Image Processing, Jan. 7, 2004, vol. 5308, pp. 1362-1370, ISSN: 0277-786X, DOI: 10.1117/12.532675.

\* cited by examiner

ADAPTIVE OVERLAPPED BLOCK MOTION COMPENSATION

This application claims the benefit of U.S. Provisional Application No. 61/561,783, filed Nov. 18, 2011.

TECHNICAL FIELD

This disclosure relates to video coding and, more particularly, adaptively performing overlapped block motion compensation during video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predicted block for a block to be coded. Residual data represents pixel differences between the original block to be coded and the predicted block. An inter-coded block is encoded according to a motion vector that points to a block of reference samples forming the predicted block, and the residual data indicating the difference between the coded block and the predicted block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for performing adaptive overlapped block motion compensation when coding video data. A video encoder may implement the techniques described in this disclosure to adaptively perform OBMC in a number of ways. Rather than blankly apply OBMC to pixels along a so-called motion boundary, which refers to a boundary between two partitions of a block of video data commonly referred to as prediction units (PUs) in emerging video coding standards, the techniques may adapt application of OBMC to a particular block of video data so as to potentially improve smoothing of pixels along the motion boundary without reducing perceived visual quality in some instances. That is, there may be some instances where preserving sharp edges (which is one example of a discontinuity) along a motion boundary may be desirable to preserve high visual quality. To accommodate these instances, OBMC may be adapted in accordance with the techniques described in this disclosure to potentially reduce those discontinuities that would have resulted in a reduction of perceived visual quality while also preserving those discontinuities that result in maintaining or increasing perceived visual quality.

In one example, a method for coding video data comprises determining an adaptation metric from a region of support for one of a first partition and a second partition of one or more blocks of the video data separated by a partition boundary, wherein the region of support is not the entire one or more blocks of video data. The method further comprises adapting, based on the adaptation metric, application of an overlapped block motion compensation process to determine predicted pixel values near the partition boundary for a first predicted block representative of the first partition of the video block.

In another example, a video coding device configured to code video data comprises one or more processors configured to determine an adaptation metric from a region of support for one of a first partition and a second partition of one or more blocks of the video data separated by a partition boundary, wherein the region of support is not the entire one or more blocks of video data, and adapt, based on the adaptation metric, application of an overlapped block motion compensation process to determine predicted pixel values near the partition boundary for a first predicted block representative of the first partition of the video block.

In another example, a video coding device configured to code video data comprises means for determining an adaptation metric from a region of support for one of a first partition and a second partition of one or more blocks of the video data separated by a partition boundary, wherein the region of support is not the entire one or more blocks of video data, and means for adapting, based on the adaptation metric, application of an overlapped block motion compensation process to determine predicted pixel values near the partition boundary for a first predicted block representative of the first partition of the video block.

In another example, a computer program product comprising a computer-readable storage medium having stored thereon instructions that, when executed, cause one or more processors of a device for coding video data to determine an adaptation metric from a region of support for one of a first partition and a second partition of one or more blocks of the video data separated by a partition boundary, wherein the region of support is not the entire one or more blocks of video data, and adapt, based on the adaptation metric, application of an overlapped block motion compensation process to determine predicted pixel values near the partition boundary for a first predicted block representative of the first partition of the video block.

The details of one or more examples are set forth in the accompanying drawings and the description below. Other features, objects, and advantages will be apparent from the description and drawings, and from the claims.

DETAILED DESCRIPTION

Figure 1:
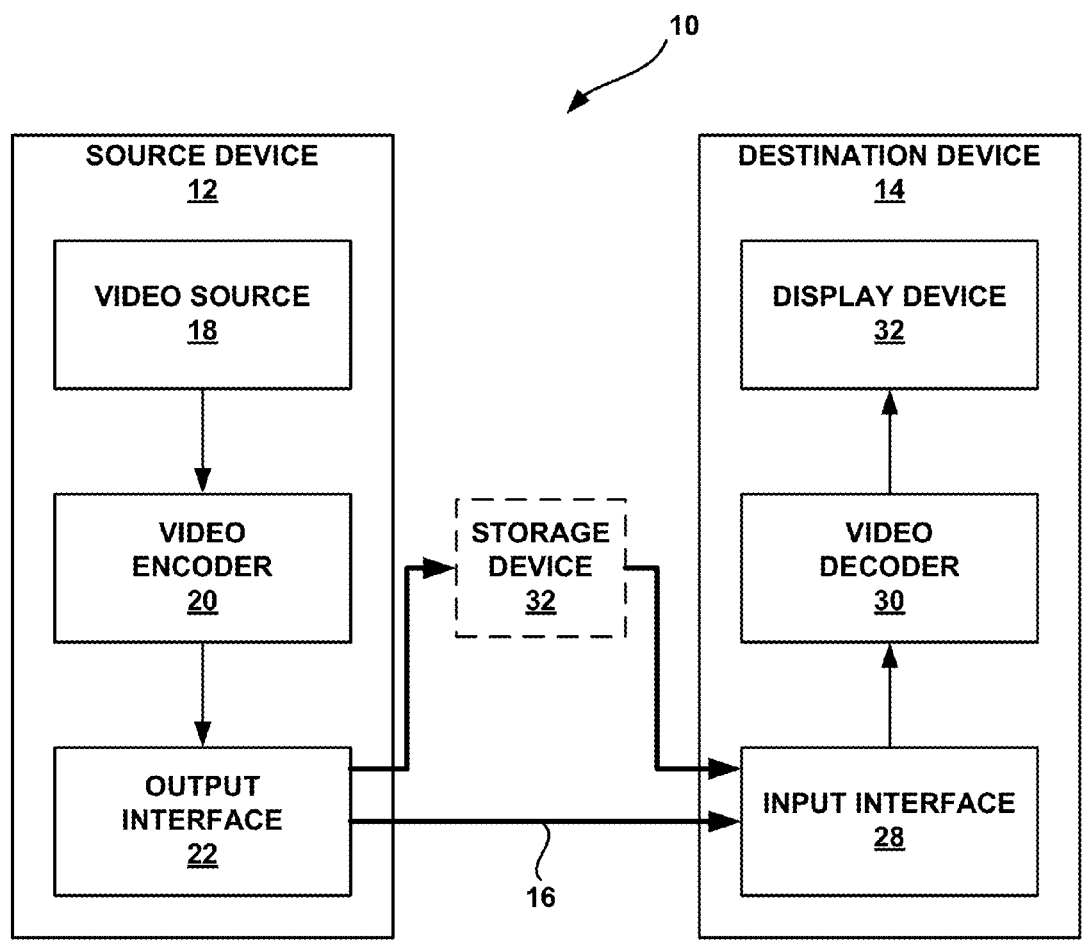
FIG. 1 is a block diagram illustrating an example video encoding and decoding system that may utilize the adaptive overlapped block motion compensation techniques described in this disclosure.

Techniques are described in this disclosure that may enable a video coder, such as either a video encoder or a video decoder, to adaptively perform overlapped block motion compensation (OBMC). OBMC refers to techniques that smoothes pixel values along a motion boundary, where the term "motion boundary" refers to a boundary between what are commonly referred to as "prediction units" or "PUs" in the emerging video coding standard referred to as High Efficiency Video Coding (HEVC) currently under development. These prediction units denote portions of a coding node of a coding unit (CU) for which motion compensation and motion estimation may be performed to determine, when these portions are inter-coded, a motion vector.

Typically, this motion boundary (which also may be referred to as a "prediction boundary") represents a line of discontinuity between the adjacent prediction units, as the video coder may determine different motion vectors for each of the prediction units. This discontinuity may result in coding inefficiency as discontinuities or large changes in pixel values may require more bits to code. Moreover, such discontinuities may, if not adequately coded at sufficient bit rates, result in visual artifacts that may be noticeable and therefore detract from the quality of the video data when reconstructed from coded video data. OBMC may be applied at these motion boundaries to smooth or otherwise reduce the extent of this discontinuity, thereby potentially improving coding bit rates and the occurrence of visual artifacts.

OBMC generally involves generating two predictions for pixels within a region or area surrounding this prediction boundary. One of the two predictions uses the motion vector of one prediction unit along the prediction boundary while the other or second one of the two predictions uses the motion vector of the second prediction unit along the prediction boundary. Thus, in OBMC, a first pixel value is predicted for a pixel of the prediction block using a motion vector (which may be denoted "MV0") determined for a first prediction unit (which may be denoted "PU0") along the prediction boundary between the first PU and a second PU while a second pixel value for the pixel of the prediction block is predicted using a motion vector (which may be denoted as "MV1") determined for the second PU (which may be denoted "PU1") along the prediction boundary between PU0 and PU1.

To determine the final pixel value for this prediction block, the video encoder typically combines both the first and second pixel values by performing a weighted sum of the pixel values, often assigning a higher weight to the pixel value predicted using the MV associated with the portion identified by the PU in which the pixel of the prediction block resides and a lesser weight to the pixel value predicted using the MV that is not associated with the portion identified by the PU in which the pixel of the prediction block does not reside. The video coder then uses the result of the weighted sum as the pixel value for the prediction block. In this manner, the video coder may perform OBMC to smooth discontinuities along a prediction boundary, which again may improve coding efficiency (in terms of bits used to code the video data) and potentially reduce artifacts.

While OBMC may generally smooth pixel values along prediction boundaries, there are some instances where preserving sharp edges (which is one example of a discontinuity) may be desirable to preserve high visual quality. In some instances, for example, such discontinuities may be necessary to properly define objects or motion in a given video frame and smoothing these discontinuities may result in undesirable blurry or ill-defined objects that severely detract from the visual quality. The techniques of this disclosure may adapt OBMC in an attempt to avoid smoothing discontinuities that may enhance visual quality.

To illustrate, a video encoder may implement the techniques described in this disclosure to adaptively perform OBMC based on pixel values in a transition region, a sub-block of pixel values within the transition region, particular characteristics of a partition, boundary conditions along a transition region of a particular partition or any combination of one or more of the foregoing. The term "transition region" may generally refer to pixels near or adjacent to a partition boundary within one or both of the partitions adjacent to the partition boundary.

The video coder may adapt the application of OBMC in a number of ways. In some instances, the video coder may adapt the weights used when computing the weighted sum of the first and second pixel values. While described with respect to first and second pixel values, OBMC may involve more than two pixel values to determine the predicted pixel value. In these instances, OBMC may be considered to apply a smoothing filter that is typically of various sizes, such as a 3×3 or 5×5 (where this notation may refer to a smoothing filter applied to an array of 3 pixels by 3 pixels or 5 pixels by 5 pixels), within one or across two or more partitions of a portion of the video data. That is, the filtering may be performed so that filter is applied to pixels in a first partition and pixels in a second partition of the block of video data. In some instances, the techniques may adapt the coefficients of these filters. In other instances, the video coder may perform this adaptation by selecting different filters for different pixels in the transition region, for example, from a predefined non-zero set of filters. In other instances, the video coder may adaptively perform OBMC by enabling and disabling such filtering. In some instances, the video encoder may adaptively perform OBMC using a combination of two or more of the three adaptation aspects of the techniques described above.

In operation, the video coder may first determine a region of support, which refers to an area that the video coder considers to determine what may be referred to as adaptation metrics. The region of support may comprise a whole frame or a region within a frame. The region of support may comprise a subset of the pixels within the considered blocks. The region of support, in other words, may not comprise the whole frame or block but only a portion or subset of the pixels within the frame or block. Typically, for purposes of reducing memory bandwidth requirements, the region of support covers the blocks adjacent to the partition boundary. In some implementation, to further reduce memory bandwidth requirements, the video decoder may determine the region of support to include the transition regions of each of the partitions forming or along the partition boundary. The region of support may include interpolated pixels, which typically occur as a result of using motion vectors having quarter or half pel pixel precision.

In any event, after determining the one or more regions of support, the video coder then determines the adaptation metric for the determined one or more regions of support. To illustrate, for a given one of the regions of support, the video coder may compute the difference between two pixels values of the same position, where one of the pixel values is predicted from the current partition motion vector from that position and the other is predicted from the motion vector for the other partition. The video coder may compute the difference as an absolute value of the difference or as a squared error difference.

The techniques may be implemented such that any number of adaptations may be used either alone or in varying combinations with one another to fit a wide variety of complexity (in terms of a number of operations performed) and memory bandwidth requirements. Considering, as one example, computation complexity as a main requirement, a partition based adaptation may be implemented in a video coder. This exemplary video coder implementation of adaptive OMBC may involve an adaptation to enable or disable OBMC. The region of support for this exemplary implementation may be defined as a portion of a transition region, such as the central region of the transition region, or a down-sampled transition region. For the adaptation metric, the exemplary implementation may set the metric as the absolute difference of the pixels in the region of support. Based on this combination, the exemplary video coder implementation of OBMC enables or disables OBMC based on the sum of absolute difference of pixels in both the partition and the central region of the transition region. If the sum of absolute difference is greater than a threshold, the video coder disables OBMC for this partition. Alternatively, if the sum of absolute difference is less than or equal to the threshold, the video coder enables OBMC for this partition.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 12. The encoded video data may be transmitted directly to destination device 14 via output interface 22 of source device 20. The encoded video data may also (or alternatively) be stored onto storage device 32 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, a prediction direction (whether bi-predicted or uni-predicted) and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

The techniques described in this disclosure may generally be implemented after performing motion estimation and compensation to generate a predicted video block (which may be referred to herein as a predicted block). This predicted block may be smoothed along a so-called prediction boundary to reduce discontinuities using the above noted OBMC process. The techniques may enable adaptive application of OBMC so that some discontinuities that may provide for a better viewing quality or experience are not smoothed while others that do not generally provide for better viewing quality or experience are smoothed. By adaptively applying OBMC, the techniques may enable a video coder, such as video encoder 20 and/or video decoder 30, to potentially provide at least some the coding efficiency and artifact reducing benefits typically provided by OBMC without sacrificing much in the way of visual quality.

Figure 4:
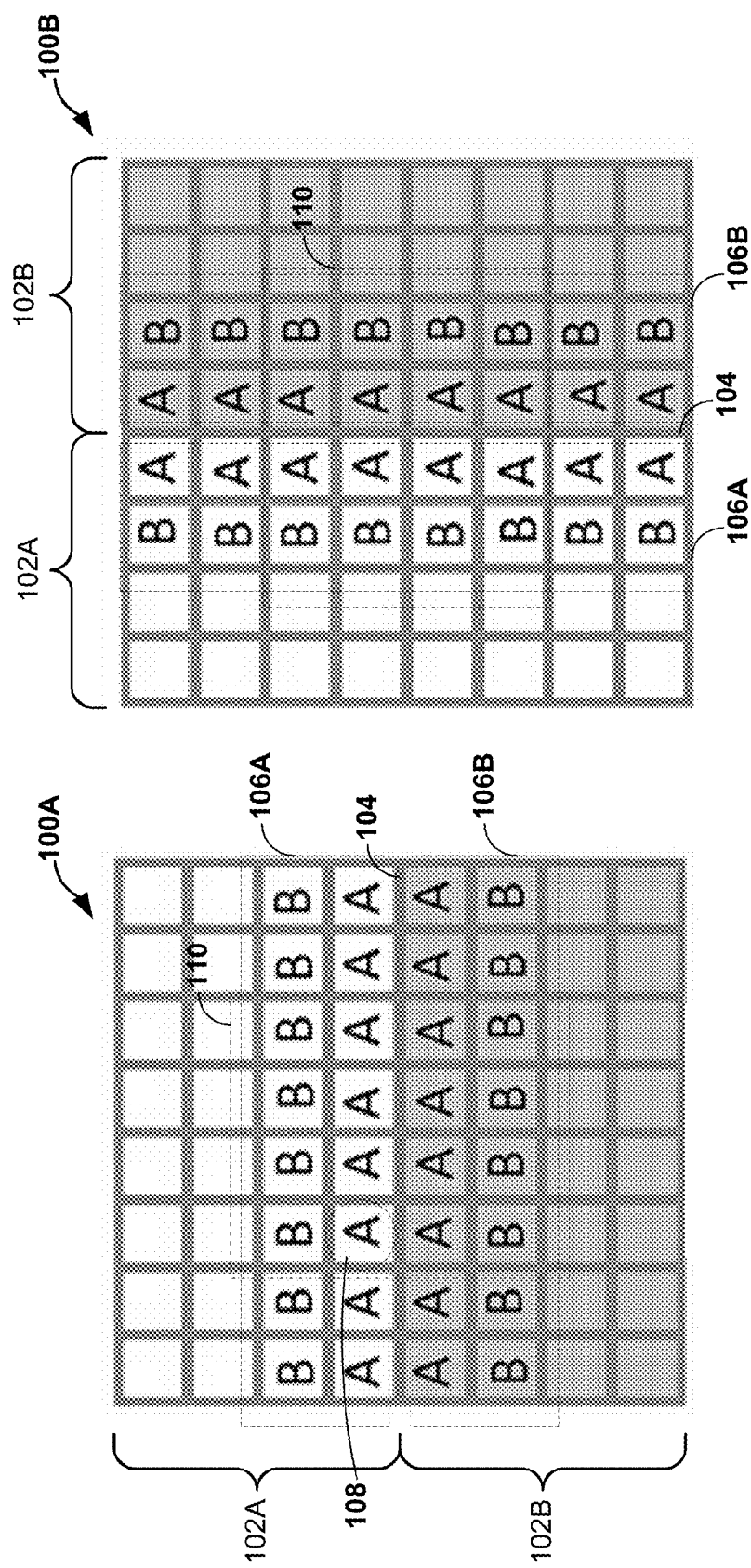
FIGS. 4A, 4B are diagrams illustrating respective blocks to which the adaptive OBMC techniques may be applied.

In operation, the video coder determines an adaptation metric from a region of support for one of a first partition and a second partition of a block of the video data separated by a partition boundary. The video coder then adapts, based on the adaptation metric, application of the OBMC process to determine predicted pixel values near the partition boundary for a first predicted block representative of the first partition of the video block. This process of determining an adaptation metric and adapting application of the OBMC process may occur for each of the pixels in the so-called transition region, which may represent a region centered on the current pixel that is commonly of a size of 5×5 or 3×3 pixels and that includes at least one pixel from the other partition. This transition region is described in more detail with respect to the example of FIG. 4. In any event, the techniques may therefore adapt the OBMC process on a pixel by pixel, sub-block by subblock, transition region by transition region, partition by partition or generally any other region of support by region of support basis such that the OBMC process is applied differently over time.

Figure 2:
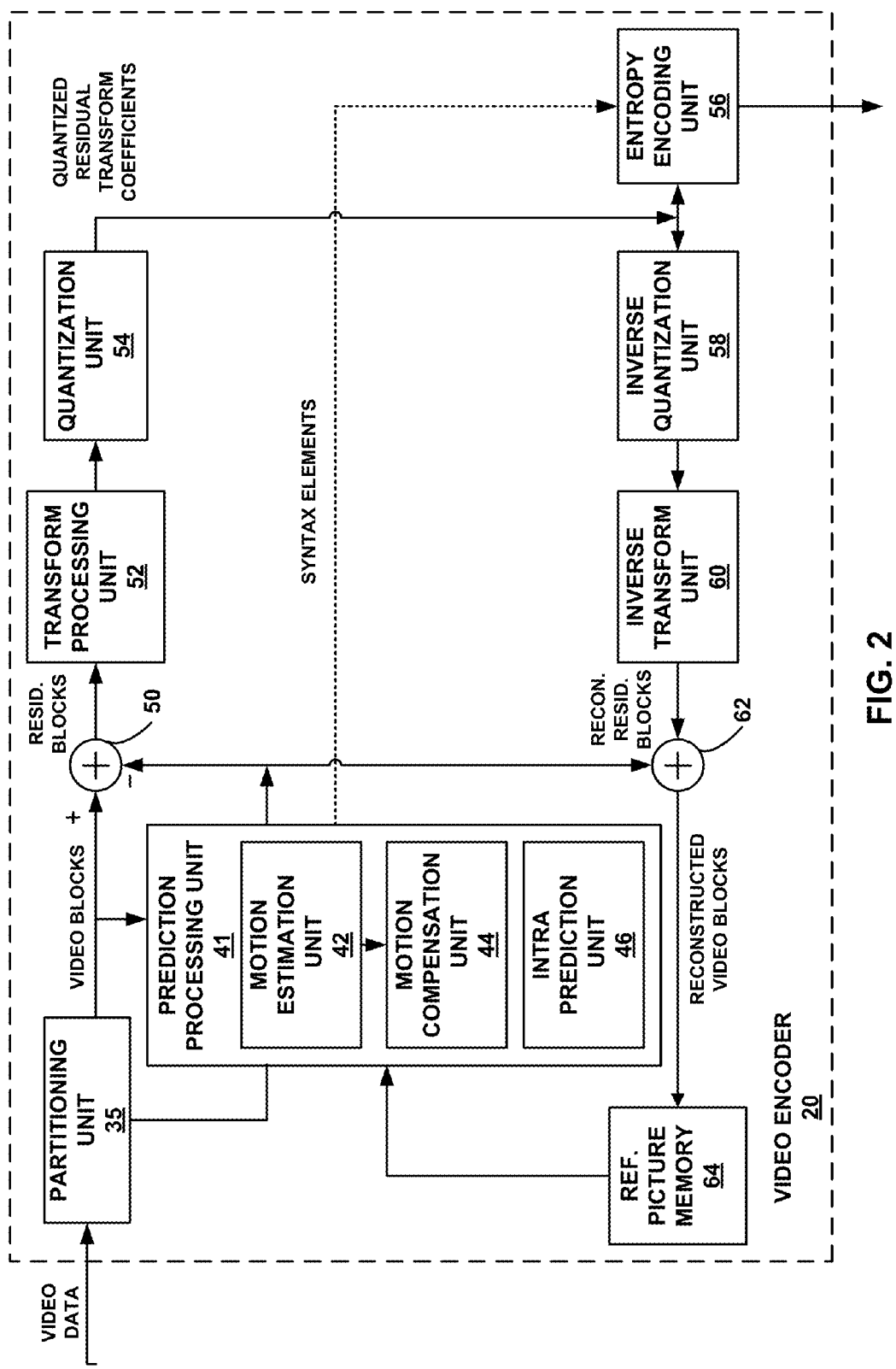
FIG. 2 is a block diagram illustrating an example video encoder that may implement the adaptive overlapped block motion compensation techniques described in this disclosure.

FIG. 2 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction processing unit 41, reference picture memory 64, summer 50, transform processing unit 52, quantization unit 54, and entropy encoding unit 56. Prediction processing unit 41 includes motion estimation unit 42, motion compensation unit 44, and intra prediction unit 46. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predicted blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predicted block within a reference picture.

A predicted block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predicted block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Video encoder 20 forms a residual video block by subtracting pixel values of the predicted block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes. For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block. Examples of intra prediction modes and corresponding mode indexes that may be used with HEVC are shown in Appendix 2.

In any case, after selecting an intra-prediction mode for a block, intra-prediction unit 46 may provide information indicative of the selected intra-prediction mode for the block to entropy coding unit 56. Entropy coding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predicted block for the current video block via either inter-prediction or intra-prediction, video encoder 20 forms a residual video block by subtracting the predicted block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform unit 60 apply inverse quantization and inverse transformation, respectively, to reconstruct the residual block in the pixel domain for later use as a reference block of a reference picture. Motion compensation unit 44 may calculate a reference block by adding the residual block to a predicted block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

As described above, motion compensation unit 44 may perform inter-prediction to determine a predicted video block. In some instances, motion compensation unit 44 may perform a form of motion compensation referred to as overlapped block motion compensation (OBMC). OBMC refers to techniques that smoothes pixel values along a motion boundary, where the term "motion boundary" refers to a boundary between what are commonly referred to as "prediction units" or "PUs" in the emerging video coding standard referred to as High Efficiency Video Coding (HEVC) currently under development. These prediction units denote portions of a coding node of a coding unit (CU) for which motion compensation and motion estimation may be performed to determine, when these portions are inter-coded, a motion vector.

Typically, this motion boundary (which also may be referred to as a "prediction boundary") represents a line of discontinuity between the adjacent prediction units, as the video coder may determine different motion vectors for each of the prediction units. This discontinuity may result in coding inefficiency as discontinuities or large changes in pixel values may require more bits to code. Moreover, such discontinuities may, if not adequately coded at sufficient bit rates, result in visual artifacts that may be noticeable and therefore detract from the quality of the video data when reconstructed from coded video data. OBMC may be applied at these motion boundaries to smooth or otherwise reduce the extent of this discontinuity, thereby potentially improving coding bit rates and the occurrence of visual artifacts.

OBMC generally involves generating two predictions for pixels within a region or area surrounding this prediction boundary. One of the two predictions uses the motion vector of one prediction unit along the prediction boundary while the other or second one of the two predictions uses the motion vector of the second prediction unit along the prediction boundary. Thus, in OBMC, a first pixel value is predicted for a pixel of the prediction block using a motion vector (which may be denoted "MV0") determined for a first prediction unit (which may be denoted "PU0") along the prediction boundary between the first PU and a second PU, while a second pixel value for the pixel of the prediction block is predicted using a motion vector (which may be denoted as "MV1") determined for the second PU (which may be denoted "PU1") along the prediction boundary between PU0 and PU1.

To determine the final pixel value for this prediction block, motion compensation unit 44 typically combines both the first and second pixel values by performing a weighted sum of the pixel values. Often, motion compensation unit 44 assigns a higher weight to the pixel value predicted using the MV associated with the portion identified by the PU in which the pixel of the prediction block resides and a lesser weight to the pixel value predicted using the MV that is not associated with the portion identified by the PU in which the pixel of the prediction block does not reside. Motion compensation unit 44 then uses the result of the weighted sum as the pixel value for the predicted block. In this manner, motion compensation unit 44 may perform OBMC to smooth discontinuities along a prediction boundary, which again may improve coding efficiency (in terms of bits used to code the video data) and potentially reduce artifacts.

While OBMC may generally smooth pixel values along prediction boundaries, there are some instances where preserving sharp edges (which is one example of a discontinuity) may be necessary to preserve high visual quality. In some instances, for example, such discontinuities may be necessary to properly define objects or motion in a given video frame and smoothing these discontinuities may result in undesirable blurry or ill-defined objects that severely detract from the visual quality. The techniques of this disclosure may adapt OBMC in an attempt to avoid smoothing discontinuities that may enhance visual quality.

To illustrate, motion compensation unit 44 may implement the techniques described in this disclosure to adaptively perform OBMC based on pixel values in a transition region, a sub-block of pixel values within the transition region, particular characteristics of a partition, boundary conditions along a transition region of a particular partition or any combination of one or more of the foregoing. The term "transition region" may generally refer to pixels near or adjacent to a partition boundary within one or both of the partitions adjacent to the partition boundary.

For example, motion compensation unit 44 may adaptively perform different OBMC methods with respect to two or more pixels within the transition region. As another example, motion compensation unit 44 may adaptively perform different OBMC methods with respect to two or more sub-blocks of pixel values within the transition region. As yet another example, motion compensation unit 44 may adaptively perform different OBMC methods with respect to the transition regions of each of the partitions forming or adjacent to the partition boundary. As still yet another example, motion compensation unit 44 may adaptively perform different OBMC methods with respect to the transition regions of both of the partitions forming or adjacent to the partition boundary.

Motion compensation unit 44 may adapt the application of OBMC in a number of ways. In some instances, motion compensation unit 44 may adapt the weights used when performing the weighted sum of the first and second pixel values. While described with respect to first and second pixel values, OBMC may involve more than two pixel values to determine the predicted pixel value. In these instances, OBMC may be considered to apply a smoothing filter of one or more various sizes, such as a 3×3 or 5×5. In some instances, the techniques may adapt the coefficients of these filters. In other instances, motion compensation unit 44 may perform this adaptation by selecting different filters for different pixels in the transition region, for example, from a predefined non-zero set of filters. In other instances, motion compensation unit 44 may adaptively perform OBMC by enabling and disabling such filtering. In some instances, motion compensation unit 44 may adaptively perform OBMC using a combination of two or more of the three adaptation aspects of the techniques described above.

In operation, motion compensation unit 44 may first determine a region of support, which refers to an area that the video coder considers to determine what may be referred to as adaptation metrics. The region of support may comprise a whole frame or a region within a frame. In other words, the region of support may not include the entire or whole frame but only include a portion of the whole frame. In some instances, the region of support may comprise a subset of the pixels within the considered blocks. Typically, for purposes of reducing memory bandwidth requirements, the region of support covers the blocks adjacent to the partition boundary. In some implementation, to further reduce memory bandwidth requirements, motion compensation unit 44 may determine the region of support to include the transition regions of each of partitions forming or along the partition boundary. The region of support may include interpolated pixels, which typically occur as a result of using motion vectors having quarter or half pel pixel precision.

In some implementations, motion compensation unit 44 may lower the resolution of motion vectors to reduce the number of pixels in the region of support (commonly to reduce complexity of determining this region of support as the pixel interpolation process required when utilizing non-integer pel pixel precision motion vectors may introduce complexity in terms of the number of operations performed) by reducing quarter pel pixel precision motion vectors to half pel or integer pel pixel precision motion vectors and/or half pel pixel precision motion vectors to integer pel pixel precision motion vectors.

In any event, after determining the one or more regions of support, motion compensation unit 44 then determines the adaptation metric for the determined one or more regions of support. To illustrate, for a given one of the regions of support, motion compensation unit 44 computes the difference between two pixels values of the same position, where one of the pixel values is predicted from the current partition motion vector from that position and the other is predicted from the motion vector for the other partition. The video coder may compute the difference as an absolute value of the difference or as a squared error difference. Mathematically, one difference may be expressed as $\text{diff}(x,y)=|\text{pix}_{curr}(x,y)-\text{pix}_{other}(x,y)|$, where $\text{pix}_{curr}(x,y)$ is the value of the pixel fetched from the motion vector of current partition and $\text{pix}_{other}(x,y)$ is the value of the pixel fetched from motion vector of neighboring partition for (x,y)-th position.

As another example, motion compensation unit 44 may derive an adaptation metric as an average of the difference over a subset or all of the pixels within one of the determined regions of support. Mathematically, this may be expressed as $\text{diff}=\text{avg}(\text{diff}(x,y))$, where (x,y) belongs to the pixels of the regions of support. In this example, motion compensation unit 44 determines the difference for each pixel in the region of support in the manner described above, adds the differences together to determine a total difference and divides the total difference by the number of pixels in the region of support. As yet another example, motion compensation unit 44 may, for each partition, derive a weighted average of pixels within a region of support.

The above adaptation metrics all relate to these adapted based on pixel values. Other adaptation metrics may be determined based on other contexts. In some instances, motion compensation unit 44 may selectively enable and disable OBMC so as to avoid instances of average or worst case memory bandwidth consumption. That is, motion compensation unit 44 may selectively enable and disable OBMC based on motion vector values (e.g., whether the motion vector is an integer or fractional pel precision motion vector). Motion compensation unit 44 may, for example, disable OBMC when the motion vector is of half pel or quarter pel (e.g., fractional) precision. Motion compensation unit 44 may signal in a picture parameter set (PPS), a sequence parameter set (SPS) and/or an adaptation parameter set (APS) whether half pel or quarter pel motion vector accuracy is used to selectively enable and/or disable OBMC.

In some instances, motion compensation unit 44 may selectively enable and disable OBMC depending on block size and/or transform size. For example, if the motion vector is smaller than a threshold denoted "T_blksize," motion compensation unit 44 may disable OBMC. A typical T_blksize may comprise a transform block size of 16×16. Motion compensation unit 44 may "signal" T_blksize in a picture parameter set (PPS), a sequence parameter set (SPS) and/or an adaptation parameter set (APS) T_blksize.

In some instances, motion compensation unit 44 may selectively enable and disable OBMC based on inter-prediction direction. For example, if PU0 indicates that the first partition is to be bi-predicted (meaning that its corresponding prediction block is predicted using more than one motion vector), motion compensation unit 44 may disable OBMC for the second partition identified by PU1. Motion compensation unit 44 may selectively disable OBMC for the second partition because motion compensation unit 44 would need to fetch extra lines using motion information of the partition identified by P0. Because this partition is bi-predicted, the video coder is required to fetch data from two frames, which increases memory bandwidth. In another example, if the first partition identified by P0 is bi-predicted and a second partition is uni-predicted, motion compensation unit 44 may disable OBMC for the first partition and enable OBMC for the second partition. Motion compensation unit 44 may disable OBMC for the first partition because of the extra line fetching required when using motion information of bi-prediction P0 and the prediction block generated from performing bi-prediction may be more accurate than that generated using uni-prediction. In other words, the techniques generally attempt to perform OBMC in areas where accuracy is determined to be irrelevant, such as when uni-prediction is performed, or when large blocks are used, as these generally correspond to video data that is not intricate, highly textured or otherwise specifying large amounts of detail.

The techniques may also include aspects directed to adapting application of OBMC based on motion information, such as a pixel precision of motion vectors or prediction direction (e.g., whether bi-prediction or uni-prediction). For example, motion compensation unit 44 may determine a pixel precision for a motion vector of a partition as half or quarter pel and, to reduce complexity (in terms of operations) and memory bandwidth requirements, reduce the resolution of the motion vector such that the pixel precision of the motion vector is half pel (if the original is quarter pel), integer pel or even a zero value. The reduced resolution motion vector may therefore represent a rounded/quantized version of the original motion vector. Thus, OBMC may be adapted to accommodate lower precision motion vectors than those originally specified in the bitstream or derived during encoding.

As another example, motion compensation unit 44 may adapt OBMC in response to a prediction direction. To illustrate, motion compensation unit 44 may determine whether a given partition is to be bi-predicted from two reference frames or uni-predicted from a single reference frame. If bi-predicted, motion compensation unit 44 may adapt OBMC to utilize only one of the motion vectors referencing one of the two reference frames rather than utilize both of the motion vectors. In this manner, motion compensation unit 44 may implement the techniques to again, reduce memory bandwidth requirements.

Motion compensation unit 44 may employ this adaptation metric to determine a type of OBMC to apply to a given partition. For example, motion compensation unit 44 may compare the amplitude of the diff(x,y) to a threshold and enable OBMC if diff(x,y) is less than the threshold and disable OBMC if diff(x,y) is greater than or equal to the threshold. As another example, motion compensation unit 44 may compare the amplitude of diff(x,y) to a threshold to determine whether to use a strong filter (e.g., if diff(x,y) is less than a threshold) or a weak filter (e.g., if diff(x,y) is greater than or equal to the threshold). As yet another example, motion compensation unit 44 may scale filter coefficients of a smoothing filter used in performing OBMC based on diff(x,y). Again, diff(x,y) may represent the difference in amplitude between two pixels values of the same position, where one of the pixel values is predicted from the current partition motion vector from that position and the other is predicted from the motion vector for the other partition.

In any event, the techniques may be implemented such that any number of the foregoing adaptations may be used either alone or in varying combinations with one another to fit a wide variety of complexity (in terms of a number of operations performed) and memory bandwidth requirements. Considering, as one example, computation complexity as a main requirement, a partition based adaptation may be implemented in motion compensation unit 44. This exemplary implementation of adaptive OMBC may involve an adaptation to enable or disable OBMC. The region of support for this exemplary implementation may be defined as a portion of a transition region, such as the central region of the transition region, or a down-sampled transition region. For the adaptation metric, the exemplary implementation may set the metric as the absolute difference of the pixels in the region of support. Based on this combination, the exemplary implementation of OBMC enables or disables OBMC based on the sum of absolute difference of pixels in both the partition and the central region of the transition region. If the sum of absolute difference is greater than a threshold, motion compensation unit 44 disables OBMC for this partition. Alternatively, if the sum of absolute difference is less than or equal to the threshold, motion compensation unit 44 enables OBMC for this partition.

While described in this disclosure as mostly involving inferred adaptation of OBMC, in some instances, whether OBMC is enabled or disabled may be explicitly signaled. A level of such signaling may, for example, include the LCU level, the slice header level, the APS level, PPS level or SPS level. A scope of such signaling may, for example, include whether OBMC is enabled and/or disabled for all CU sizes for a given level of signaling and/or whether OBMC is enabled and/or disabled for a subset of CU sizes for a given level of signaling. The techniques should therefore not be strictly limited to implementation where adaptation of the OBMC process is inferred or statically set, but may include both explicitly signaled implementation and dynamic (e.g., context based) derivations of the adaptation of the OBMC process.

In this manner, video encoder 20 of FIG. 2 represents an example of a video encoder configured to determine an adaptation metric from a region of support for one of a first partition and a second partition of a block of the video data separated by a partition boundary. Video encoder 20 may further be configured to adapt, based on the adaptation metric, application of an overlapped block motion compensation process to determine predicted pixel values near the partition boundary for a first predicted block representative of the first partition of the video block.

The region of support may comprise one of a frame in which the video block resides, a region of the frame in which the video block resides, the first partition, the second partition, and a transition region for either the first partition or the second partition that includes a portion of the pixels near the partition boundary in either the first partition or the second partition, a down-sampled version of the first partition, a down-sampled version of the second partition, and a down-sampled version of the transition region for either the first or the second partition.

In addition, video encoder 20 may be configured to determine the adaptation metric as a difference between a first predicted pixel value for at least one pixel in the region of support and a second predicted pixel value for the at least one pixel in the region of support. The first partition may be associated with a first motion vector referencing a first block of a first reference frame. The second partition may be associated with a second motion vector referencing a second block of a second reference frame. The first predicted pixel value may be predicted from the first motion vector. The second predicted pixel value may be predicted form the second motion vector.

Moreover, video encoder 20 may be configured to determine the adaptation metric as an absolute difference between first predicted pixel values for each pixel in the region of support and second predicted pixel values for each pixel in the region of support. The first partition may be associated with a first motion vector referencing a first block of a first reference frame. The second partition may be associated with a second motion vector referencing a second block of a second reference frame. The first predicted pixel values may be predicted from the first motion vector for each of the pixels in the region of support. The second predicted pixel values may be predicted form the second motion vector for each of the pixels in the region of support.

Furthermore, video encoder 20 may be configured to determine the adaptation metric as an average pixel difference between first predicted pixel values for each pixel in the region of support and second predicted pixel values for each of the pixels in the region of support. The first partition may be associated with a first motion vector referencing a first block of a first reference frame. The second partition may be associated with a second motion vector referencing a second block of a second reference frame. The first predicted pixel values may be predicted from the first motion vector for each of the pixels in the region of support. The second predicted pixel value may be predicted form the second motion vector for each of the pixels in the region of support.

In some instances, video encoder 20 may be configured to determine the adaptation metric as an average weighted average of pixels in the region of support.

In other instances, the first partition may be associated with a motion vector having a precision and video encoder 20 may be configured to determine the adaptation metric as the precision of the motion vector, and adapt the application of the overlapped block motion compensation process by selectively disabling application of the overlapped block motion compensation process when the precision of the motion vector is less than a threshold precision. The threshold precision may comprise one of integer precision, half pel precision, and quarter pel precision.

In yet other instances, the block may be associated with a block size and video encoder 20 may be configured to determine the adaptation metric as the block size, and adapt the application of the overlapped block motion compensation process by selectively disabling application of the overlapped block motion compensation process when block size is less than a block size threshold. The block size may comprise one of a video block size and a transform block size identifying a size of a transform applied to the first partition of the block.

In some examples, the first partition may be associated with a prediction direction, and video encoder 20 may be configured to determine the adaptation metric as the prediction direction. Video encoder 20 may then adapt application of the overlapped block motion compensation process by selectively disabling application of the overlapped block motion compensation process to the second partition when the prediction direction of the first partition is bi-directional.

In other examples, the first partition may be associated with a first prediction direction, the second partition may be associated with a second prediction direction, and video encoder 20 may be configured to determine the adaptation metric as the first prediction direction and the second prediction direction, and adapt the application of the overlapped block motion compensation process by selectively disabling application of the overlapped block motion compensation process to the first partition when the first prediction direction is bi-directional and the second prediction direction is uni-directional and selectively enabling application of the overlapped block motion compensation process to the first partition when the first prediction direction is bi-directional and the second prediction direction is uni-directional.

In yet other examples, the first partition may be associated with a motion vector having a precision and video encoder 20 may be configured to determine the adaptation metric as the precision of the motion vector, and adapt the application of the overlapped block motion compensation process by reducing the precision of the motion vector when precision of the motion vector is fractional to adapt the application of the overlapped block motion compensation process to use the reduced precision motion vector in place of the motion vector associated with the first partition.

Additionally, the first partition may be associated with a prediction direction and video encoder 20 may be configured to determine the prediction direction, adapting the application of the overlapped block motion compensation process by selecting only one of two motion vectors associated with the first partition when the determined prediction direction is bi-directional to adapt application of the overlapped block motion compensation process to use only the selected one of the two motion vectors in place of the two motion vectors.

In some other examples, the region of support may comprise one or more of a portion of a transition region for the first partition that includes a portion of the pixels near the partition boundary in the first partition, a down-sampled version of the transition region for the first partition, and the first partition. The region of support may not, in some instances, include the entire block of video data. In these examples, video encoder 20 may be configured to determine the adaptation metric as an absolute difference between first predicted pixel values for each pixel in the region of support and second predicted pixel values for each pixel in the region of support. With respect to these examples, the first partition may be associated with a first motion vector referencing a first block of a first reference frame, and the second partition may be associated with a second motion vector referencing a second block of a second reference frame. Additionally, the first predicted pixel values may be predicted from the first motion vector for each of the pixels in the region of support, and the second predicted pixel values may be predicted form the second motion vector for each of the pixels in the region of support. Video encoder 20 may further be configured to adapt the application of the overlapped block motion compensation process by selectively disabling application of the overlapped block motion compensation process when the determined absolute difference is greater than a difference threshold.

Figure 3:
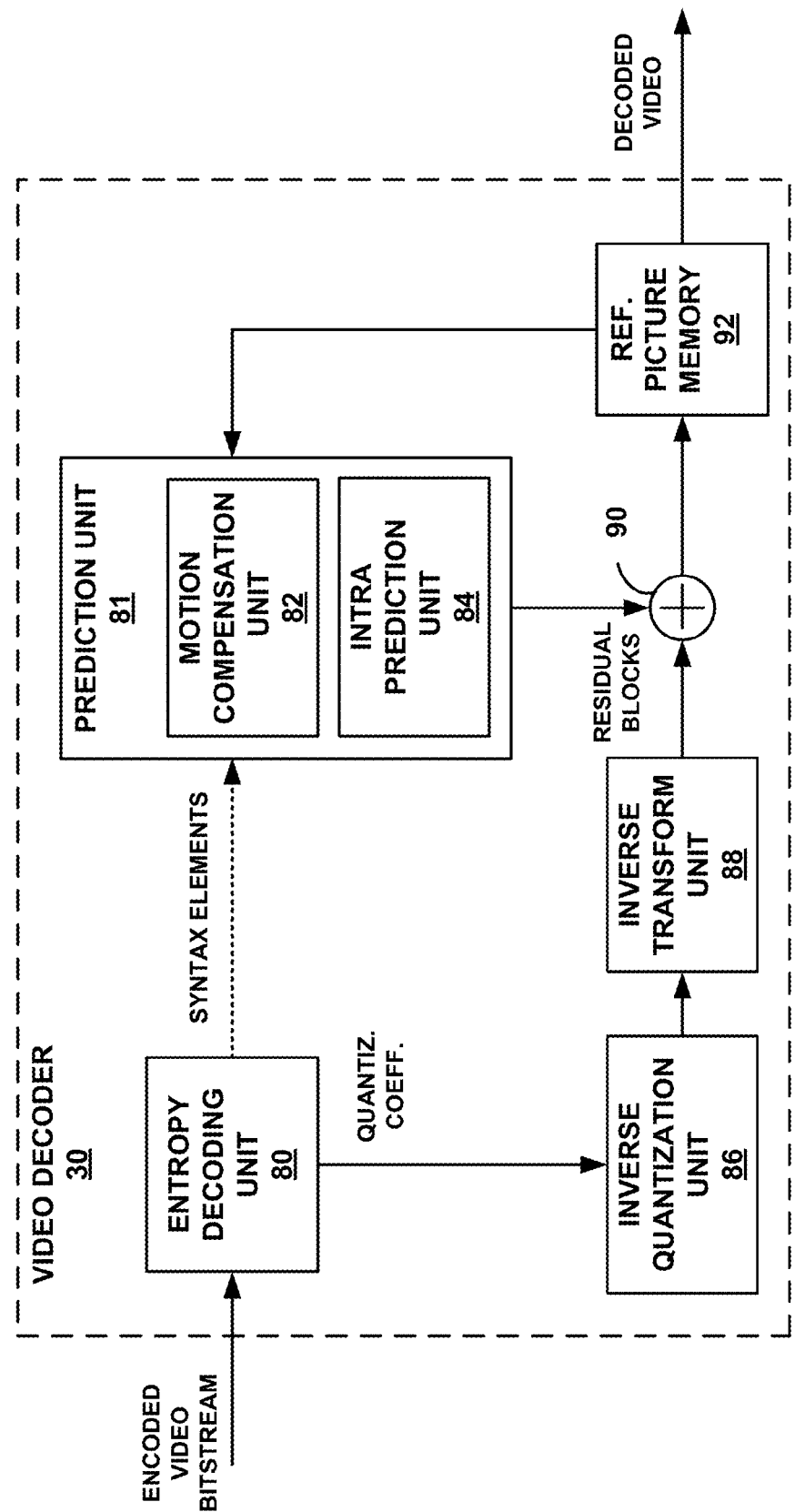
FIG. 3 is a block diagram illustrating an example video decoder that may implement the techniques described in this disclosure.

FIG. 3 is a block diagram illustrating an example video decoder 30 that may implement the techniques described in this disclosure. In the example of FIG. 3, video decoder 30 includes an entropy decoding unit 80, prediction unit 81, inverse quantization unit 86, inverse transformation unit 88, summer 90, and reference picture memory 92. Prediction unit 81 includes motion compensation unit 82 and intra prediction unit 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction unit 81. Video decoder 30 may receive the syntax elements at the video slice level and/or the video block level.

When the video slice is coded as an intra-coded (I) slice, intra prediction unit 84 of prediction unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction unit 81 produces predicted blocks for a video block of the current video slice based on the motion vectors and other syntax elements received from entropy decoding unit 80. The predicted blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predicted blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predicted blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predicted block for the current video block based on the motion vectors and other syntax elements, video decoder 30 forms a decoded video block by summing the residual blocks from inverse transform unit 88 with the corresponding predicted blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

As described above, motion compensation unit 82 may perform inter-prediction to determine a predicted video block. In some instances, motion compensation unit 82 may perform a form of motion compensation referred to as overlapped block motion compensation (OBMC). OBMC refers to techniques that smoothes pixel values along a motion boundary, where the term "motion boundary" refers to a boundary between what are commonly referred to as "prediction units" or "PUs" in the emerging video coding standard referred to as High Efficiency Video Coding (HEVC) currently under development. These prediction units denote portions of a coding node of a coding unit (CU) for which motion compensation and motion estimation may be performed to determine, when these portions are inter-coded, a motion vector.

To determine the final pixel value for this prediction block, motion compensation unit 82 typically combines both the first and second pixel values by performing a weighted sum of the pixel values. Often, motion compensation unit 82 assigns a higher weight to the pixel value predicted using the MV associated with the portion identified by the PU in which the pixel of the prediction block resides and a lesser weight to the pixel value predicted using the MV that is not associated with the portion identified by the PU in which the pixel of the prediction block does not reside. Motion compensation unit 82 then uses the result of the weighted sum as the pixel value for the predicted block. In this manner, motion compensation unit 82 may perform OBMC to smooth discontinuities along a prediction boundary, which again may improve coding efficiency (in terms of bits used to code the video data) and potentially reduce artifacts.

While OBMC may generally smooth pixel values along prediction boundaries, there are some instances where preserving sharp edges (which is one example of a discontinuity) may be necessary to preserve high visual quality. In some instances, for example, such discontinuities may be necessary to properly define objects or motion in a given video frame and smoothing these discontinuities may result in undesirable blurry or ill-defined objects that severely detract from the visual quality. The techniques of this disclosure may adapt OBMC in an attempt to avoid smoothing discontinuities that may enhance visual quality.

To illustrate, motion compensation unit 82 may implement the techniques described in this disclosure to adaptively perform OBMC based on pixel values in a transition region, a sub-block of pixel values within the transition region, particular characteristics of a partition, boundary conditions along a transition region of a particular partition or any combination of one or more of the foregoing. The term "transition region" may generally refer to pixels near or adjacent to a partition boundary within one or both of the partitions adjacent to the partition boundary.

For example, motion compensation unit 82 may adaptively perform different OBMC methods with respect to two or more pixels within the transition region. As another example, motion compensation unit 82 may adaptively perform different OBMC methods with respect to two or more sub-blocks of pixel values within the transition region. As yet another example, motion compensation unit 82 may adaptively perform different OBMC methods with respect to the transition regions of each of the partitions forming or adjacent to the partition boundary. As still yet another example, motion compensation unit 82 may adaptively perform different OBMC methods with respect to the transition regions of both of the partitions forming or adjacent to the partition boundary.

Motion compensation unit 82 may adapt the application of OBMC in a number of ways. In some instances, motion compensation unit 82 may adapt the weights used when performing the weighted sum of the first and second pixel values. While described with respect to first and second pixel values, OBMC may involve more than two pixel values to determine the predicted pixel value. In these instances, OBMC may be considered to apply a smoothing filter of one or more various sizes, such as a 3×3 or 5×5. In some instances, the techniques may adapt the coefficients of these filters. In other instances, motion compensation unit 82 may perform this adaptation by selecting different filters for different pixels in the transition region, for example, from a predefined non-zero set of filters. In other instances, motion compensation unit 82 may adaptively perform OBMC by enabling and disabling such filtering. In some instances, motion compensation unit 82 may adaptively perform OBMC using a combination of two or more of the three adaptation aspects of the techniques described above.

In operation, motion compensation unit 82 may first determine a region of support, which refers to an area that the video coder considers to determine what may be referred to as adaptation metrics. The region of support may comprise a whole frame or a region within a frame. In other words, the region of support may not include the entire or whole frame but only include a portion of the whole frame. In some instances, the region of support may comprise a subset of the pixels within the considered blocks. Typically, for purposes of reducing memory bandwidth requirements, the region of support covers the blocks adjacent to the partition boundary. In some implementation, to further reduce memory bandwidth requirements, motion compensation unit 82 may determine the region of support to include the transition regions of each of partitions forming or along the partition boundary. The region of support may include interpolated pixels, which typically occur as a result of using motion vectors having quarter or half pel pixel precision.

In some implementations, motion compensation unit 82 may lower the resolution of motion vectors to reduce the number of pixels in the region of support (commonly to reduce complexity of determining this region of support as the pixel interpolation process required when utilizing non-integer pel pixel precision motion vectors may introduce complexity in terms of the number of operations performed) by reducing quarter pel pixel precision motion vectors to half pel or integer pel pixel precision motion vectors and/or half pel pixel precision motion vectors to integer pel pixel precision motion vectors.

In any event, after determining the one or more regions of support, motion compensation unit 82 then determines the adaptation metric for the determined one or more regions of support. To illustrate, for a given one of the regions of support, motion compensation unit 82 computes the difference between two pixels values of the same position, where one of the pixel values is predicted from the current partition motion vector from that position and the other is predicted from the motion vector for the other partition. The video coder may compute the difference as an absolute value of the difference or as a squared error difference. Mathematically, one difference may be expressed as $\text{diff}(x,y)=|\text{pix}_{curr}(x,y)-\text{pix}_{other}(x,y)|$, where $\text{pix}_{curr}(x,y)$ is the pixel fetched from the motion vector of current partition and $\text{pix}_{other}(x,y)$ is the pixel fetched from motion vector of neighboring partition for (x,y)-th position.

As another example, motion compensation unit 82 may derive an adaptation metric as an average of the difference over a subset or all of the pixels within one of the determined regions of support. Mathematically, this may be expressed as $\text{diff}=\text{avg}(\text{diff}(x,y))$, where (x,y) belongs to the pixels of the regions of support. In this example, motion compensation unit 82 determines the difference for each pixel in the region of support in the manner described above, adds the differences together to determine a total difference and divides the total difference by the number of pixels in the region of support. As yet another example, motion compensation unit 82 may, for each partition, derive a weighted average of pixels within a region of support.

The above adaptation metrics all relate to these adapted based on pixel values. Other adaptation metrics may be determined based on other contexts. In some instances, motion compensation unit 82 may selectively enable and disable OBMC so as to avoid instances of average or worst case memory bandwidth consumption. That is, motion compensation unit 82 may selectively enable and disable OBMC based on motion vector values (e.g., whether the motion vector is an integer or fractional pel precision motion vector). Motion compensation unit 82 may, for example, disable OBMC when the motion vector is of half pel or quarter pel (e.g., fractional) precision. As described above, motion compensation unit 44 of video encoder 20 may signal, in a picture parameter set (PPS), a sequence parameter set (SPS) and/or an adaptation parameter set (APS), whether half pel or quarter pel motion vector accuracy is used to selectively enable and/or disable OBMC.

In some instances, motion compensation unit 82 may selectively enable and disable OBMC depending on block size and/or transform size. For example, if the motion vector is smaller than a threshold denoted "T_blksize," motion compensation unit 82 may disable OBMC. A typical T_blksize may comprise a transform block size of 16×16. Again, video encoder 20 may "signal" T_blksize in a picture parameter set (PPS), a sequence parameter set (SPS) and/or an adaptation parameter set (APS) T_blksize.

In some instances, motion compensation unit 82 may selectively enable and disable OBMC based on inter-prediction direction. For example, if PU0 indicates that the first partition is to be bi-predicted (meaning that its corresponding prediction block is predicted using more than one motion vector), motion compensation unit 82 may disable OBMC for the second partition identified by PU1. Motion compensation unit 82 may selectively disable OBMC for the second partition because motion compensation unit 82 would need to fetch extra lines using motion information of the partition identified by P0. Because this partition is bi-predicted, the video coder is required to fetch data from two frames, which increases memory bandwidth. In another example, if the first partition identified by P0 is bi-predicted and a second partition is uni-predicted, motion compensation unit 82 may disable OBMC for the first partition and enable OBMC for the second partition. Motion compensation unit 82 may disable OBMC for the first partition because of the extra line fetching required when using motion information of bi-prediction P0 and the prediction block generated from performing bi-prediction may be more accurate than that generated using uni-prediction. In other words, the techniques generally attempt to perform OBMC in areas where accuracy is determined to be irrelevant, such as when uni-prediction is performed, or when large blocks are used, as these generally correspond to video data that is not intricate, highly textured or otherwise specifying large amounts of detail.

The techniques may also include aspects directed to adapting application of OBMC based on motion information, such as a pixel precision of motion vectors or prediction direction (e.g., whether bi-prediction or uni-prediction). For example, motion compensation unit 82 may determine a pixel precision for a motion vector of a partition as half or quarter pel and, to reduce complexity (in terms of operations) and memory bandwidth requirements, reduce the resolution of the motion vector such that the pixel precision of the motion vector is half pel (if the original is quarter pel), integer pel or even a zero value. The reduced resolution motion vector may therefore represent a rounded/quantized version of the original motion vector. Thus, OBMC may be adapted to accommodate lower precision motion vectors than those originally specified.

As another example, motion compensation unit 82 may adapt OBMC in response to a prediction direction. To illustrate, motion compensation unit 82 may determine whether a given partition is to be bi-predicted from two reference frames or uni-predicted from a single reference frame. If bi-predicted, motion compensation unit 82 may adapt OBMC to utilize only one of the motion vectors referencing one of the two reference frames rather than utilize both of the motion vectors. In this manner, motion compensation unit 82 may implement the techniques to again, reduce memory bandwidth requirements.

Motion compensation unit 82 may employ this adaptation metric to determine a type of OBMC to apply to a given partition. For example, motion compensation unit 82 may compare the amplitude of the diff(x,y) to a threshold and enable OBMC if diff(x,y) is less than the threshold and disable OBMC if diff(x,y) is greater than or equal to the threshold. As another example, motion compensation unit 82 may compare the amplitude of diff(x,y) to a threshold to determine whether to use a strong filter (e.g., if diff(x,y) is less than a threshold) or a weak filter (e.g., if diff(x,y) is greater than or equal to the threshold). As yet another example, motion compensation unit 82 may scale filter coefficients of a smoothing filter used in performing OBMC based on diff(x,y).

In any event, the techniques may be implemented such that any number of the foregoing adaptations may be used either alone or in varying combinations with one another to fit a wide variety of complexity (in terms of a number of operations performed) and memory bandwidth requirements. Considering, as one example, computation complexity as a main requirement, a partition based adaptation may be implemented in motion compensation unit 82. This exemplary implementation of adaptive OMBC may involve an adaptation to enable or disable OBMC. The region of support for this exemplary implementation may be defined as a portion of a transition region, such as the central region of the transition region, or a down-sampled transition region. For the adaptation metric, the exemplary implementation may set the metric as the absolute difference of the pixels in the region of support. Based on this combination, the exemplary implementation of OBMC enables or disables OBMC based on the sum of absolute difference of pixels in both the partition and the central region of the transition region. If the sum of absolute difference is greater than a threshold, motion compensation unit 82 disables OBMC for this partition. Alternatively, if the sum of absolute difference is less than or equal to the threshold, motion compensation unit 82 enables OBMC for this partition.

While described in this disclosure as mostly involving inferred adaptation of OBMC, in some instances, whether OBMC is enabled or disabled may be explicitly signaled. A level of such signaling may, for example, include the LCU level, the slice header level, the APS level, PPS level or SPS level. A scope of such signaling may, for example, include whether OBMC is enabled and/or disabled for all CU sizes for a given level of signaling and/or whether OBMC is enabled and/or disabled for a subset of CU sizes for a given level of signaling. The techniques should therefore not be strictly limited to implementation where adaptation of the OBMC process is inferred or statically set, but may include both explicitly signaled implementation and dynamic (e.g., context based) derivations of the adaptation of the OBMC process.

In this manner, video decoder 30 of FIG. 3 represents an example of a video decoder configured to determine an adaptation metric from a region of support for one of a first partition and a second partition of a block of the video data separated by a partition boundary and adapt, based on the adaptation metric, application of an overlapped block motion compensation process to determine predicted pixel values near the partition boundary for a first predicted block representative of the first partition of the video block.

The region of support may comprise one of a frame in which the video block resides, a region of the frame in which the video block resides, the first partition, the second partition, and a transition region for either the first partition or the second partition that includes a portion of the pixels near the partition boundary in either the first partition or the second partition, a down-sampled version of the first partition, a down-sampled version of the second partition, and a down-sampled version of the transition region for either the first or the second partition.

In addition, video encoder 30 may be configured to determine the adaptation metric as a difference between a first predicted pixel value for at least one pixel in the region of support and a second predicted pixel value for the at least one pixel in the region of support. The first partition may be associated with a first motion vector referencing a first block of a first reference frame. The second partition may be associated with a second motion vector referencing a second block of a second reference frame. The first predicted pixel value may be predicted from the first motion vector. The second predicted pixel value may be predicted form the second motion vector.

Moreover, video decoder 30 may be configured to determine the adaptation metric as an absolute difference between first predicted pixel values for each pixel in the region of support and second predicted pixel values for each pixel in the region of support. The first partition may be associated with a first motion vector referencing a first block of a first reference frame. The second partition may be associated with a second motion vector referencing a second block of a second reference frame. The first predicted pixel values may be predicted from the first motion vector for each of the pixels in the region of support. The second predicted pixel values may be predicted form the second motion vector for each of the pixels in the region of support.

Furthermore, video decoder 30 may be configured to determine the adaptation metric as an average pixel difference between first predicted pixel values for each pixel in the region of support and second predicted pixel values for each of the pixels in the region of support. The first partition may be associated with a first motion vector referencing a first block of a first reference frame. The second partition may be associated with a second motion vector referencing a second block of a second reference frame. The first predicted pixel values may be predicted from the first motion vector for each of the pixels in the region of support. The second predicted pixel value may be predicted form the second motion vector for each of the pixels in the region of support.

In some instances, video decoder 30 may be configured to determining the adaptation metric as an average weighted average of pixels in the region of support.

In other instances, the first partition may be associated with a motion vector having a precision and video decoder 30 may be configured to determine the adaptation metric as the precision of the motion vector, and adapt the application of the overlapped block motion compensation process by selectively disabling application of the overlapped block motion compensation process when the precision of the motion vector is less than a threshold precision. The threshold precision may comprise one of integer precision, half pel precision, and quarter pel precision.

In yet other instances, the block may be associated with a block size and video decoder 30 may be configured to determine the adaptation metric as the block size, adapting the application of the overlapped block motion compensation process comprises selectively disabling application of the overlapped block motion compensation process when block size is less than a block size threshold. The block size may comprise one of a video block size and a transform block size identifying a size of a transform applied to the first partition of the block.

In some examples, the first partition may be associated with a prediction direction, and video decoder 30 may be configured to determine the adaptation metric as the prediction direction adapting application of the overlapped block motion compensation process by selectively disabling application of the overlapped block motion compensation process to the second partition when the prediction direction of the first partition is bi-directional.

In other examples, the first partition may be associated with a first prediction direction, the second partition may be associated with a second prediction direction, and video decoder 30 may be configured to determine the adaptation metric as the first prediction direction and the second prediction direction, and adapt the application of the overlapped block motion compensation process by selectively disabling application of the overlapped block motion compensation process to the first partition when the first prediction direction is bi-directional and the second prediction direction is uni-directional and selectively enabling application of the overlapped block motion compensation process to the first partition when the first prediction direction is bi-directional and the second prediction direction is uni-directional.

In yet other examples, the first partition may be associated with a motion vector having a precision and video decoder 30 may be configured to determine the adaptation metric as the precision of the motion vector, and adapt the application of the overlapped block motion compensation process by reducing the precision of the motion vector when precision of the motion vector is fractional to adapt the application of the overlapped block motion compensation process to use the reduced precision motion vector in place of the motion vector associated with the first partition.

Additionally, the first partition may be associated with a prediction direction and video decoder 30 may be configured to determine the prediction direction, adapting the application of the overlapped block motion compensation process by selecting only one of two motion vectors associated with the first partition when the determined prediction direction is bi-directional to adapt application of the overlapped block motion compensation process to use only the selected one of the two motion vectors in place of the two motion vectors.

In some other examples, the region of support may comprise one or more of a portion of a transition region for the first partition that includes a portion of the pixels near the partition boundary in the first partition, a down-sampled version of the transition region for the first partition, and the first partition. The region of support may not, in some instances, include the entire block of video data. In these examples, video decoder 30 may be configured to determine the adaptation metric as an absolute difference between first predicted pixel values for each pixel in the region of support and second predicted pixel values for each pixel in the region of support.

With respect to these examples, the first partition may be associated with a first motion vector referencing a first block of a first reference frame, and the second partition may be associated with a second motion vector referencing a second block of a second reference frame. Additionally, the first predicted pixel values may be predicted from the first motion vector for each of the pixels in the region of support, and the second predicted pixel values may be predicted form the second motion vector for each of the pixels in the region of support. Video decoder 30 may further be configured to adapt the application of the overlapped block motion compensation process by selectively disabling application of the overlapped block motion compensation process when the determined absolute difference is greater than a difference threshold.

FIGS. 4A, 4B are diagrams illustrating respective blocks 100A, 100B to which the adaptive OBMC techniques may be applied. Each of block 100A, 100B includes a partition 102A and partition 102B separated by a partition boundary 104. Each of partitions 102A, 102B includes a transition region 106A, 106B, respectively that is near (at most, two pixels away from, in the examples of FIG. 4A, 4B) partition boundary 104. While shown as including pixels at most two pixels away from partition boundary 104, transition regions 106A, 106B may include more or less pixels. Moreover, transition regions 106A, 106B may not necessarily include the same number of pixels. The difference between blocks 100A and 100B is in the difference in partitions 102A, 102B, where block 100A has been horizontally partitioned and block 100B has been vertically partitioned. More examples of partitions are shown with respect to FIG. 5.

While the techniques of this disclosure are described and shown as being performed with respect to a single block of video data, the techniques may additionally be performed with respect to two or more blocks. In other words, the techniques may be performed across a boundary between two blocks. The transition region may, in this instance, comprise pixels from a partition of first block and a partition of a second block. In some instances, the partition of the first block may comprise the entire first block or some portion thereof and the partition of the second block may comprise the entire second block or some portion thereof. The techniques may, in this manner, determine an adaptation metric from a region of support for one of a first partition and a second partition of one or more blocks of the video data separated by a partition boundary. The techniques should therefore not be limited to the examples provided in this disclosure.

Figure 5:
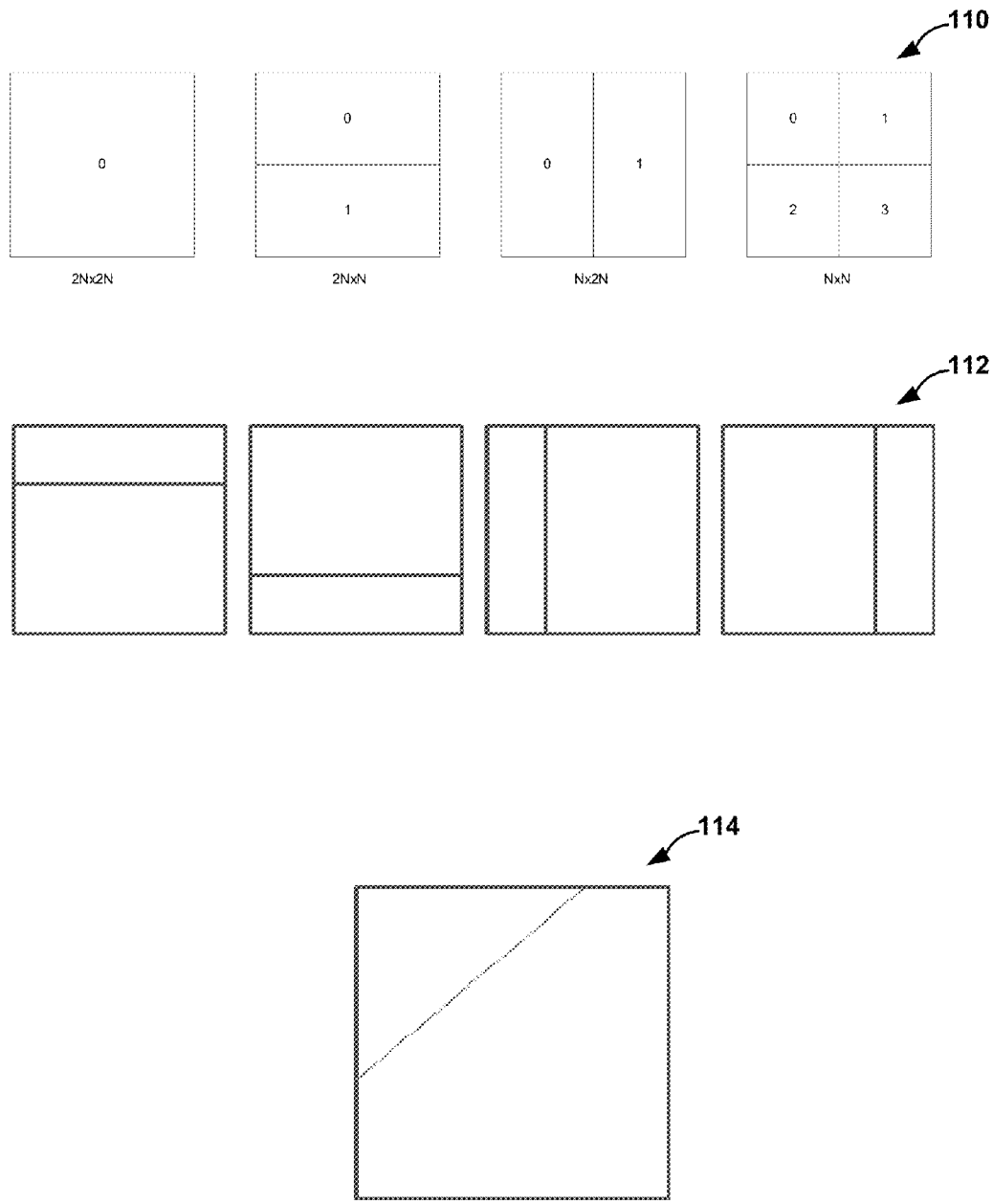
FIG. 5 is a diagram illustrating potential ways a block of video data may be partitioned.

FIG. 5 is a diagram illustrating potential ways a block of video data may be partitioned. In the example of FIG. 5, partition modes 110 represent symmetric rectangular or square partitioning modes. Partition modes 112 represent asymmetric partitioning modes. Partition mode 114 represents one example of geometric partition modes. Using HEVC as an example, the frame partition can be first divided into a number of largest coding units (LCUs), and a typical LCU size is 64×64. A LCU can be further divided into smaller CUs, and each CU can be further divided. The split of CU can be partitioned symmetrically according to partition modes 110, asymmetrically according to partition modes 112 and geometrically according to the geometric partition modes, such as geometric partition mode 114.

Referring back to FIG. 4A, a video coder, e.g., video encoder 20 and/or video decoder 30 shown with respect to FIGS. 1-3, may implement OBMC by overlapping two predictions for pixels inside the transition region. To define this transition region, the video coder may identify a current pixel, such as pixel 108, and form a 3×3 window or block of pixels centered on pixel 108. If any one of the pixels within the window belongs to the partition to which pixel 108 does not belong (where, in the example of FIG. 4A, pixel 108 belongs to partition 106A and at least one of the pixels in the 3×3 window centered on pixel 108 belongs to partition 106B), the current pixel, pixel 108, may be classified as belonging to the transition region. This transition region, while described as being defined with respect to a 3×3 window, may also be defined with respect to any other size of window.

After classifying pixels to transition regions, the video coder may then identify a region of support in the manner described above. This region of support may comprise the whole frame or some portion of the frame, where commonly the region of support is defined as less than the whole frame for memory bandwidth reasons discussed above. In the example of FIG. 4A, the video coder identifies region of support 110, which comprises a portion of block 100A. The video coder may then identify, based on the pixel values of pixels in region of support 110, an adaptation metric in the manner described above. Using this adaptation metric, the video encoder may then adaptively perform OBMC in the various ways described above. While described with respect to FIG. 4A, the techniques may likewise be implemented with respect to the partitioning mode shown in FIG. 4B or any of those illustrated in the example of FIG. 5.

Figure 6:
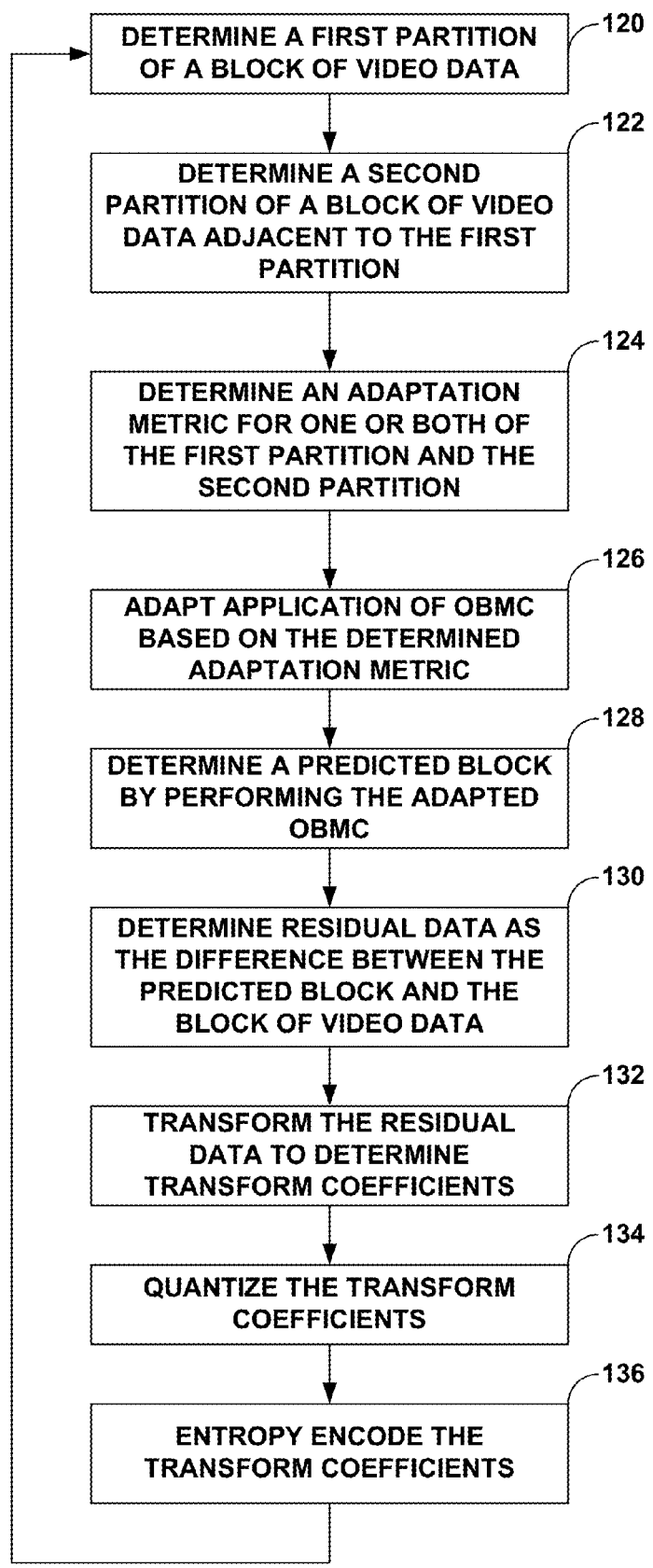
FIG. 6 is a flowchart illustrating exemplary operation of a video encoder in performing the adaptive overlapped block motion compensation techniques described in this disclosure.

FIG. 6 is a flowchart illustrating exemplary operation of a video encoder, e.g., video encoder 20 shown in the example of FIGS. 1 and 2, in performing the adaptive overlapped block motion compensation techniques described in this disclosure. Video encoder 20 initially receives video data, and partitioning unit 35 partitions the data into video blocks. This partitioning may also include partitioning into slices, tiles, or other larger units, as wells as video block partitioning, e.g., according to a quadtree structure of LCUs and CUs. That is, partitioning unit 35 may implement one of the partition modes shown in the examples of FIGS. 4A, 4B, 5 to form a first partition and a second partition within a block of video data, where these partitions may, for example, represent separate prediction units (PUs). In this respect, partitioning unit 35 may determine a first partition of a block of video data and determine a second partition of a block of video data (120, 122).

Motion estimation unit 42 calculates a motion vector for each of the first and second partitions (PUs) of a video block in an inter-coded slice by comparing the position of the PU to the position of a predicted block of a reference picture. As described above, the reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation unit 44 may be configured to perform the adaptive OBMC techniques described in this disclosure, whereby motion compensation unit 44 may be configured to determine an adaptation metric for one or both of the first partition and the second partition in the manner described above (124). That is, motion compensation unit 44 may identify a region of support in the manner described above and, based on this region of support, compute an adaptation metric. Motion compensation unit 44 may further be configured to adapt application of OBMC based on the determined adaptation metric, again as described above (126). As further described above, motion compensation unit 44 may also be configured to determine a predicted block of video data by performing the adapted OBMC (128).

Motion compensation unit 44 then forms a residual video block by subtracting pixel values of the predicted block from the pixel values of the current video block being coded, forming the residual data as pixel difference values (130). Summer 50 represents the component or components that perform this subtraction operation. Motion compensation unit 44 may also generate syntax elements associated with the video blocks and the video slice for use by video decoder 30 in decoding the video blocks of the video slice.

Transform processing unit 52 then transforms the residual video data to determine transform coefficients using a transform, such as a discrete cosine transform (DCT) or a conceptually similar transform (132). Transform processing unit 52 may convert the residual video data from a pixel (spatial) domain to a transform domain, such as a frequency domain. Transform processing unit 52 may send the resulting transform coefficients to quantization unit 54. Quantization unit 54 quantizes the transform coefficients to further reduce bit rate (134). The quantization process may reduce the bit depth associated with some or all of the coefficients. Following quantization, entropy encoding unit 56 entropy encodes the quantized transform coefficients (136).

Figure 7:
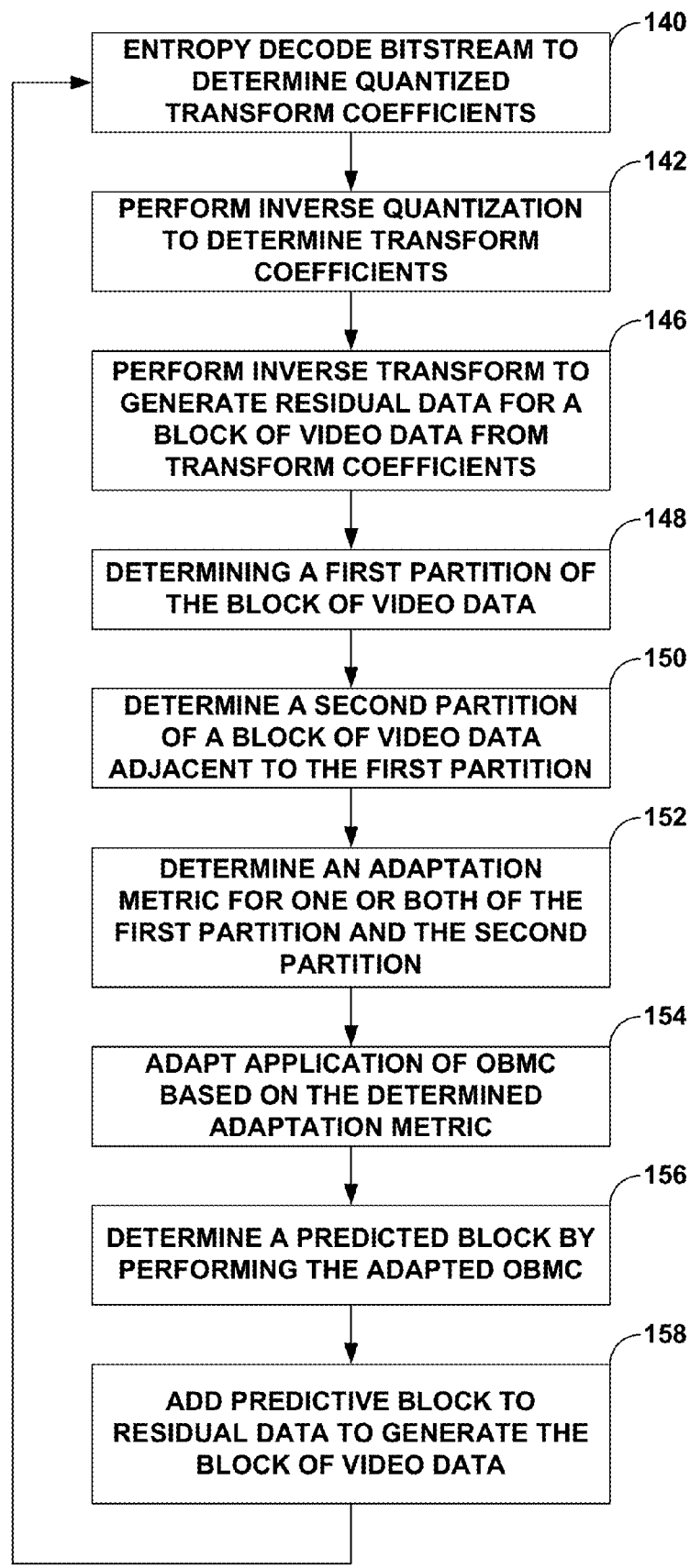
FIG. 7 is a flowchart illustrating exemplary operation of a video decoder in performing the adaptive overlapped block motion compensation techniques described in this disclosure.

FIG. 7 is a flowchart illustrating exemplary operation of a video decoder, e.g., video decoder 30 shown in the examples of FIGS. 1 and 3, in performing the adaptive overlapped block motion compensation techniques described in this disclosure. During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized transform coefficients (140). Entropy decoding unit 80 may also entropy decode the bitstream to determine various other information, such as motion vectors, and other syntax elements. Entropy decoding unit 80 forwards the motion vectors and other syntax elements to prediction unit 81. Video decoder 30 may receive the syntax elements at the video slice level and/or the video block level.

Inverse quantization unit 86 inverse quantizes, i.e., de-quantizes, the quantized transform coefficients provided in the bitstream and decoded by entropy decoding unit 80 to determine transform coefficients (142). Inverse transform unit 88 performs an inverse transform, e.g., an inverse DCT, an inverse integer transform, or a conceptually similar inverse transform process, to generate residual data for a block of video data from the transform coefficients (146).

Meanwhile, motion compensation unit 82 of prediction unit 81 produces predicted blocks for a video block of the current video slice based on the motion vectors and other syntax elements received from entropy decoding unit 80. The predicted blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predicted blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may be configured to identify or otherwise determine (often based on syntax elements that "signal" a partition mode or the hierarchical partitioning of the coding node into PUs) the first partition of the block of video data and determine the second partition of the block of video data (148, 150). Motion compensation unit 82 may further be configured to then determine an adaptation metric in the manner described above for one or both of the first partition and the second partition (152). Motion compensation unit 82 may also be configured to adapt application of OBMC based on the determined adaptation metric, again as described above (154). After adapting OBMC, motion compensation unit 82 may be configured to determine the predicted block by performing the adapted OBMC (156).

After motion compensation unit 82 generates or otherwise determines the predicted block for the current video block based on the motion vectors and other syntax elements, video decoder 30 add the predicted block to the residual data from inverse transform unit 88 to generate the block of video data (158). The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data comprising:
   determining an adaptation metric based on at least one pixel in a region of support for one of a first partition and a second partition of one or more blocks of the video data separated by a partition boundary, wherein the region of support is not the entire one or more blocks of the video data,
      wherein determining the adaptation metric comprises determining the adaptation metric based on a difference between a first predicted pixel value for the at least one pixel in the region of support and a second predicted pixel value for the at least one pixel in the region of support,
      wherein the one or more blocks of the video data are each associated with a block size,
      wherein determining the adaptation metric further comprises determining the adaptation metric based on the at least one pixel and the block size of at least one of the one or more blocks of the video data;
   adapting, based on the adaptation metric, application of an overlapped block motion compensation process to determine filtered predicted pixel values near the partition boundary for a first predicted block representative of the first partition of the video block,
      wherein adapting application of the overlapped block motion compensation process comprises adjusting a filter strength of a filter applied to predicted pixel values near the partition boundary for the first predicted block representative of the first partition of the video block,
      wherein adapting, based on the adaptation metric, application of the overlapped block motion compensation process further comprises selectively disabling application of the overlapped block motion compensation process when the determined block size is less than a block size threshold,
      wherein the overlapped block motion compensation process comprises a fetching operation for fetching a line of pixels from a memory, and
      wherein the determined block size comprises one of a video block size or a transform block size identifying a size of a transform applied to the first partition of the block; and
   outputting video data decoded using the adapted overlapped block motion compensation process.

2. The method of claim 1, wherein the region of support comprises one of a frame in which the one or more blocks of the video data resides, a region of the frame in which the block of video data resides, the first partition, the second partition, and a transition region for either the first partition or the second partition that includes a portion of the pixels near the partition boundary in either the first partition or the second partition, a down-sampled version of the first partition, a down-sampled version of the second partition, and a down-sampled version of the transition region for either the first or the second partition.

3. The method of claim 1,
   wherein the first partition is associated with a first motion vector referencing a first block of a first reference frame,
   wherein the second partition is associated with a second motion vector referencing a second block of a second reference frame,
   wherein the first predicted pixel value is predicted from the first motion vector, and
   wherein the second predicted pixel value is predicted form the second motion vector.

4. The method of claim 1,
   wherein determining the adaptation metric based on a difference between a first predicted pixel value for the at least one pixel in the region of support and a second predicted pixel value for the at least one pixel in the region of support comprises determining the adaptation metric based on an absolute difference between first predicted pixel values for each pixel in the region of support and second predicted pixel values for each pixel in the region of support,
   wherein the first partition is associated with a first motion vector referencing a first block of a first reference frame,
   wherein the second partition is associated with a second motion vector referencing a second block of a second reference frame,
   wherein the first predicted pixel values are predicted from the first motion vector for each of the pixels in the region of support, and
   wherein the second predicted pixel values are predicted form the second motion vector for each of the pixels in the region of support.

5. The method of claim 1,
   wherein determining the adaptation metric based on a difference between a first predicted pixel value for the at least one pixel in the region of support and a second predicted pixel value for the at least one pixel in the region of support comprises determining the adaptation metric based on an average pixel difference between first predicted pixel values for each pixel in the region of support and second predicted pixel values for each of the pixels in the region of support,
   wherein the first partition is associated with a first motion vector referencing a first block of a first reference frame,
   wherein the second partition is associated with a second motion vector referencing a second block of a second reference frame,
   wherein the first predicted pixel values are predicted from the first motion vector for each of the pixels in the region of support, and
   wherein the second predicted pixel value is predicted form the second motion vector for each of the pixels in the region of support.

6. The method of claim 1, wherein determining the adaptation metric comprises determining the adaptation metric based on a weighted average of pixels in the region of support.

7. The method of claim 1,
   wherein the first partition is associated with a motion vector having a precision, wherein determining the adaptation metric further comprises determining the adaptation metric based on the at least one pixel and the precision of the motion vector,
wherein selectively disabling application of the overlapped block motion compensation process further comprises selectively disabling application of the overlapped block motion compensation process when the precision of the motion vector is less than a threshold precision and the determined block size is less than the block size threshold, and
wherein the threshold precision comprises one of integer precision, half pel precision, and quarter pel precision.

8. The method of claim 1,
wherein the first partition is associated with a prediction direction,
wherein determining the adaptation metric further comprises determining the adaptation metric based on the at least one pixel and the prediction direction, and
wherein selectively disabling application of the overlapped block motion compensation process further comprises selectively disabling application of the overlapped block motion compensation process to the second partition when the prediction direction of the first partition is bi-directional.

9. The method of claim 1,
wherein the first partition is associated with a first prediction direction,
wherein the second partition is associated with a second prediction direction,
wherein determining the adaptation metric further comprises determining the adaptation metric based on the at least one pixel and the first prediction direction and the second prediction direction, and
wherein adapting, based on the adaptation metric, application of the overlapped block motion compensation process comprises:
selectively disabling application of the overlapped block motion compensation process to the first partition when the first prediction direction is bi-directional and the second prediction direction is uni-directional; and
selectively enabling application of the overlapped block motion compensation process to the first partition when the first prediction direction is uni-directional and the second prediction direction is bi-directional.

10. The method of claim 1,
wherein the first partition is associated with a motion vector having a precision,
wherein determining the adaptation metric further comprises determining the adaptation metric based on the at least one pixel and the precision of the motion vector,
wherein adapting, based on the adaptation metric, application of the overlapped block motion compensation process comprises reducing the precision of the motion vector when precision of the motion vector is fractional to adapt the application of the overlapped block motion compensation process to use the reduced precision motion vector in place of the motion vector associated with the first partition.

11. The method of claim 1,
wherein the first partition is associated with a prediction direction,
wherein determining the adaptation metric further comprises determining the adaptation metric based on the at least one pixel and the prediction direction, and
wherein adapting, based on the adaptation metric, application of the overlapped block motion compensation process comprises selecting only one of two motion vectors associated with the first partition when the determined prediction direction is bi-directional to adapt application of the overlapped block motion compensation process to use only the selected one of the two motion vectors in place of the two motion vectors.

12. The method of claim 1,
wherein the region of support comprises one or more of a portion of a transition region for the first partition that includes a portion of the pixels near the partition boundary in the first partition, a down-sampled version of the transition region for the first partition, and the first partition,
wherein determining the adaptation metric further comprises determining the adaptation metric based on an absolute difference between first predicted pixel values for each pixel in the region of support and second predicted pixel values for each pixel in the region of support,
wherein the first partition is associated with a first motion vector referencing a first block of a first reference frame,
wherein the second partition is associated with a second motion vector referencing a second block of a second reference frame,
wherein the first predicted pixel values are predicted from the first motion vector for each of the pixels in the region of support,
wherein the second predicted pixel values are predicted form the second motion vector for each of the pixels in the region of support,
wherein selectively disabling application of the overlapped block motion compensation process further comprises selectively disabling application of the overlapped block motion compensation process when the determined absolute difference is greater than a difference threshold.

13. The method of claim 1, wherein the method is performed by a wireless communication device comprising:
a memory configured to store video data;
a processor configured to execute instructions to process the video data stored in the memory; and
a receiver configured to receive the video data.

14. The method of claim 13, wherein the wireless communication device comprises a cellular telephone configured to receive a signal comprising the video data, and wherein the signal is received by the receiver and demodulated according to a cellular communication standard.

15. A video decoding device configured to decode video data, the video decoding device comprising:
a memory configured to store the video data; and
one or more processors configured to
determine an adaptation metric based on at least one pixel in a region of support for one of a first partition and a second partition of one or more blocks of the video data separated by a partition boundary, wherein the region of support is not the entire one or more blocks of the video data is not the entire one or more blocks of the video data, wherein the one or more processors are configured to, when determining the adaptation metric, determine the adaptation metric based on a difference between a first predicted pixel value for the at least one pixel in the region of support and a second predicted pixel value for the at least one pixel in the region of support, wherein the one or more blocks of the video data are each associated with a block size, wherein to determine the adaptation metric, the one or more processors are configured to determine the adaptation metric based on the at least one pixel and the block size of at least one of the one or more blocks of the video data, and adapt, based on the adaptation metric, application of an overlapped block motion compensation process to determine filtered predicted pixel values near the partition boundary for a first predicted block representative of the first partition of the video block, wherein to adapt application of the overlapped block motion compensation process, the one or more processors are further configured to adjust a filter strength of a filter applied to predicted pixel values near the partition boundary for the first predicted block representative of the first partition of the video block, wherein to adapt, based on the adaptation metric, application of the overlapped block motion compensation process, the one or more processors are further configured to selectively disable application of the overlapped block motion compensation process when the determined block size is less than a block size threshold, wherein the overlapped block motion compensation process comprises a fetching operation for fetching a line of pixels from the memory, and wherein the determined block size comprises one of a video block size or a transform block size identifying a size of a transform applied to the first partition of the block; and output video data decoded using the adapted overlapped block motion compensation process.

16. The video decoding device of claim 15, wherein the region of support comprises one of a frame in which the one or more blocks of the video data resides, a region of the frame in which the block of video data resides, the first partition, the second partition, and a transition region for either the first partition or the second partition that includes a portion of the pixels near the partition boundary in either the first partition or the second partition, a down-sampled version of the first partition, a down-sampled version of the second partition, and a down-sampled version of the transition region for either the first or the second partition.

17. The video decoding device of claim 15,
wherein the first partition is associated with a first motion vector referencing a first block of a first reference frame,
wherein the second partition is associated with a second motion vector referencing a second block of a second reference frame,
wherein the first predicted pixel value is predicted from the first motion vector, and
wherein the second predicted pixel value is predicted form the second motion vector.

18. The video decoding device of claim 15,
wherein the one or more processors are configured to, when determining the adaptation metric based on a difference between a first predicted pixel value for the at least one pixel in the region of support and a second predicted pixel value for the at least one pixel in the region of support, determine the adaptation metric based on an absolute difference between first predicted pixel values for each pixel in the region of support and second predicted pixel values for each pixel in the region of support,
wherein the first partition is associated with a first motion vector referencing a first block of a first reference frame,
wherein the second partition is associated with a second motion vector referencing a second block of a second reference frame,
wherein the first predicted pixel values are predicted from the first motion vector for each of the pixels in the region of support, and
wherein the second predicted pixel values are predicted form the second motion vector for each of the pixels in the region of support.

19. The video decoding device of claim 15,
wherein the one or more processors are configured to, when determining the adaptation metric based on a difference between a first predicted pixel value for the at least one pixel in the region of support and a second predicted pixel value for the at least one pixel in the region of support, determine the adaptation metric based on an average pixel difference between first predicted pixel values for each pixel in the region of support and second predicted pixel values for each of the pixels in the region of support,
wherein the first partition is associated with a first motion vector referencing a first block of a first reference frame,
wherein the second partition is associated with a second motion vector referencing a second block of a second reference frame,
wherein the first predicted pixel values are predicted from the first motion vector for each of the pixels in the region of support, and
wherein the second predicted pixel value is predicted form the second motion vector for each of the pixels in the region of support.

20. The video decoding device of claim 15, wherein the one or more processors are configured to, when determining the adaptation metric, determine the adaptation metric based on a weighted average of pixels in the region of support.

21. The video decoding device of claim 15,
wherein the first partition is associated with a motion vector having a precision,
wherein the one or more processors are configured to, when determining the adaptation metric, determine the adaptation metric based on the at least one pixel and the precision of the motion vector,
wherein the one or more processors are configured to, when selectively disabling application of the overlapped block motion compensation process, selectively disable application of the overlapped block motion compensation process when the precision of the motion vector is less than a threshold precision, and
wherein the threshold precision comprises one of integer precision, half pel precision, and quarter pel precision.

22. The video decoding device of claim 15,
wherein the first partition is associated with a prediction direction,
wherein the one or more processors are configured to, when determining the adaptation metric, determine the adaptation metric based on the at least one pixel and the prediction direction, and
wherein the one or more processors are configured to, when selectively disabling application of the overlapped block motion compensation process, selectively disable application of the overlapped block motion compensation process to the second partition when the prediction direction of the first partition is bi-directional.

23. The video decoding device of claim 15,
wherein the first partition is associated with a first prediction direction,
wherein the second partition is associated with a second prediction direction,
wherein the one or more processors are configured to, when determining the adaptation metric, determine the adaptation metric based on the at least one pixel and the first prediction direction and the second prediction direction, and
wherein the one or more processors are configured to, when selectively disabling application of the overlapped block motion compensation process, selectively disable application of the overlapped block motion compensation process to the first partition when the first prediction direction is bi-directional and the second prediction direction is uni-directional and selectively enable application of the overlapped block motion compensation process to the first partition when the first prediction direction is uni-directional and the second prediction direction is bi-directional.

24. The video decoding device of claim 15,
wherein the first partition is associated with a motion vector having a precision,
wherein the one or more processors are configured to, when determining the adaptation metric, determine the adaptation metric based on the at least one pixel and the precision of the motion vector, and
wherein the one or more processors are configured to, when adapting application of the overlapped block motion compensation process, reduce the precision of the motion vector when precision of the motion vector is fractional to adapt the application of the overlapped block motion compensation process to use the reduced precision motion vector in place of the motion vector associated with the first partition.

25. The video decoding device of claim 15,
wherein the first partition is associated with a prediction direction,
wherein the one or more processors are configured to, when determining the adaptation metric, determine the adaptation metric based on the at least one pixel and the prediction direction, and
wherein the one or more processors are configured to, when adapting application of the overlapped block motion compensation process, select only one of two motion vectors associated with the first partition when the determined prediction direction is bi-directional to adapt application of the overlapped block motion compensation process to use only the selected one of the two motion vectors in place of the two motion vectors.

26. The video decoding device of claim 15,
wherein the region of support comprises one or more of a portion of a transition region for the first partition that includes a portion of the pixels near the partition boundary in the first partition, a down-sampled version of the transition region for the first partition, and the first partition,
wherein the one or more processors are configured to, when determining the adaptation metric, determine the adaptation metric based on an absolute difference between first predicted pixel values for each pixel in the region of support and second predicted pixel values for each pixel in the region of support,
wherein the first partition is associated with a first motion vector referencing a first block of a first reference frame,
wherein the second partition is associated with a second motion vector referencing a second block of a second reference frame,
wherein the first predicted pixel values are predicted from the first motion vector for each of the pixels in the region of support,
wherein the second predicted pixel values are predicted form the second motion vector for each of the pixels in the region of support, and
wherein selectively disabling application of the overlapped block motion compensation process further comprises selectively disabling application of the overlapped block motion compensation process when the determined absolute difference is greater than a difference threshold.

27. The video decoding device of claim 15, wherein the device comprises a wireless communication device, and wherein the device further comprises:
a receiver configured to receive the video data.

28. The video decoding device of claim 27, wherein the wireless communication device comprises a cellular telephone configured to receive a signal comprising the video data, and wherein the signal is received by the receiver and demodulated according to a cellular communication standard.

29. A video decoding device configured to decode video data, the video decoding device comprising:
means for determining an adaptation metric based on at least one pixel in a region of support for one of a first partition and a second partition of one or more blocks of the video data separated by a partition boundary,
wherein the region of support is not the entire one or more blocks of the video data is not the entire one or more blocks of the video data,
wherein the means for determining the adaptation metric comprises means for determining the adaptation metric based on a difference between a first predicted pixel value for the at least one pixel in the region of support and a second predicted pixel value for the at least one pixel in the region of support, and
wherein the one or more blocks of the video data are each associated with a block size,
wherein the means for determining the adaptation metric further comprises means for determining the adaptation metric based on the at least one pixel and the block size of at least one of the one or more blocks of the video data;
means for adapting, based on the adaptation metric, application of an overlapped block motion compensation process to determine filtered predicted pixel values near the partition boundary for a first predicted block representative of the first partition of the video block,
wherein the means for adapting application of the overlapped block motion compensation process comprises means for adjusting a filter strength of a filter applied to predicted pixel values near the partition boundary for the first predicted block representative of the first partition of the video block;
wherein the means for adapting, based on the adaptation metric, application of the overlapped block motion compensation process further comprises means for selectively disabling application of the overlapped block motion compensation process when the determined block size is less than a block size threshold, wherein the motion compensation process comprises a fetching operation for fetching a line of pixels from a memory, and
wherein the determined block size comprises one of a video block size or a transform block size identifying a size of a transform applied to the first partition of the block; and
means for outputting video data decoded using the adapted overlapped block motion compensation process.

30. The video coding decoding device of claim 29, wherein the region of support comprises one of a frame in which the one or more blocks of the video data resides, a region of the frame in which the block of video data resides, the first partition, the second partition, and a transition region for either the first partition or the second partition that includes a portion of the pixels near the partition boundary in either the first partition or the second partition, a down-sampled version of the first partition, a down-sampled version of the second partition, and a down-sampled version of the transition region for either the first or the second partition.

31. The video coding decoding device of claim 29,
wherein the first partition is associated with a first motion vector referencing a first block of a first reference frame,
wherein the second partition is associated with a second motion vector referencing a second block of a second reference frame,
wherein the first predicted pixel value is predicted from the first motion vector, and
wherein the second predicted pixel value is predicted form the second motion vector.

32. The video decoding device of claim 29,
wherein the means for determining the adaptation metric based on a difference between a first predicted pixel value for the at least one pixel in the region of support and a second predicted pixel value for the at least one pixel in the region of support comprises means for determining the adaptation metric based on an absolute difference between first predicted pixel values for each pixel in the region of support and second predicted pixel values for each pixel in the region of support,
wherein the first partition is associated with a first motion vector referencing a first block of a first reference frame,
wherein the second partition is associated with a second motion vector referencing a second block of a second reference frame,
wherein the first predicted pixel values are predicted from the first motion vector for each of the pixels in the region of support, and
wherein the second predicted pixel values are predicted form the second motion vector for each of the pixels in the region of support.

33. The video coding decoding device of claim 29,
wherein the means for determining the adaptation metric based on a difference between a first predicted pixel value for the at least one pixel in the region of support and a second predicted pixel value for the at least one pixel in the region of support comprises means for determining the adaptation metric based on an average pixel difference between first predicted pixel values for each pixel in the region of support and second predicted pixel values for each of the pixels in the region of support, wherein the first partition is associated with a first motion vector referencing a first block of a first reference frame,
wherein the second partition is associated with a second motion vector referencing a second block of a second reference frame,
wherein the first predicted pixel values are predicted from the first motion vector for each of the pixels in the region of support, and
wherein the second predicted pixel value is predicted form the second motion vector for each of the pixels in the region of support.

34. The video coding decoding device of claim 29,
wherein the first partition is associated with a motion vector having a precision,
wherein the means for determining the adaptation metric comprises means for determining the adaptation metric based on the at least one pixel and the precision of the motion vector,
wherein the means for selectively disabling application of the overlapped block motion compensation process further comprises means for selectively disabling application of the overlapped block motion compensation process when the precision of the motion vector is less than a threshold precision, and
wherein the threshold precision comprises one of integer precision, half pel precision, and quarter pel precision.

35. The video decoding device of claim 29,
wherein the first partition is associated with a prediction direction,
wherein the means for determining the adaptation metric comprises means for determining the adaptation metric based on the at least one pixel and the prediction direction, and
wherein the means for selectively disabling application of the overlapped block motion compensation process further comprises means for selectively disabling application of the overlapped block motion compensation process to the second partition when the prediction direction of the first partition is bi-directional.

36. The video decoding device of claim 29,
wherein the first partition is associated with a first prediction direction,
wherein the second partition is associated with a second prediction direction,
wherein the means for determining the adaptation metric comprises means for determining the adaptation metric based on the at least one pixel and the first prediction direction and the second prediction direction, and
wherein the means for adapting, based on the adaptation metric, application of the overlapped block motion compensation process comprises:
means for selectively disabling application of the overlapped block motion compensation process to the first partition when the first prediction direction is bi-directional and the second prediction direction is uni-directional; and
means for selectively enabling application of the overlapped block motion compensation process to the first partition when the first prediction direction is uni-directional and the second prediction direction is bi-directional.

37. The video coding decoding device of claim 29,
wherein the first partition is associated with a motion vector having a precision, wherein the means for determining the adaptation metric comprises means for determining the adaptation metric based on the at least one pixel and the precision of the motion vector, and wherein the means for adapting, based on the adaptation metric, application of the overlapped block motion compensation process comprises means for reducing the precision of the motion vector when precision of the motion vector is fractional to adapt the application of the overlapped block motion compensation process to use the reduced precision motion vector in place of the motion vector associated with the first partition.

38. The video decoding device of claim 29, wherein the first partition is associated with a prediction direction, wherein the means for determining the adaptation metric comprises means for determining the adaptation metric based on the at least one pixel and the prediction direction, and wherein the means for adapting, based on the adaptation metric, application of the overlapped block motion compensation process comprises means for selecting only one of two motion vectors associated with the first partition when the determined prediction direction is bi-directional to adapt application of the overlapped block motion compensation process to use only the selected one of the two motion vectors in place of the two motion vectors.

39. The video decoding device of claim 29, wherein the region of support comprises one or more of a portion of a transition region for the first partition that includes a portion of the pixels near the partition boundary in the first partition, a down-sampled version of the transition region for the first partition, and the first partition, wherein the means for determining the adaptation metric comprises means for determining the adaptation metric based on an absolute difference between first predicted pixel values for each pixel in the region of support and second predicted pixel values for each pixel in the region of support, wherein the first partition is associated with a first motion vector referencing a first block of a first reference frame, wherein the second partition is associated with a second motion vector referencing a second block of a second reference frame, wherein the first predicted pixel values are predicted from the first motion vector for each of the pixels in the region of support, wherein the second predicted pixel values are predicted form the second motion vector for each of the pixels in the region of support, wherein the means for selectively disabling application of the overlapped block motion compensation process further comprises means for selectively disabling application of the overlapped block motion compensation process when the determined absolute difference is greater than a difference threshold.

40. A non-transitory computer-readable storage medium having stored thereon instructions that, when executed, cause one or more processors of a device for decoding video data to:

determine an adaptation metric based on at least one pixel in a region of support for one of a first partition and a second partition of one or more blocks of the video data separated by a partition boundary, wherein the region of support is not the entire one or more blocks of the video data, wherein the instructions, when executed, cause the one or more processors to, when determining the adaptation metric, determine the adaptation metric based on a difference between a first predicted pixel value for the at least one pixel in the region of support and a second predicted pixel value for the at least one pixel in the region of support, wherein the one or more blocks of the video data are each associated with a block size, wherein to determine the adaptation metric, the one or more processors are configured to determine the adaptation metric based on the at least one pixel and the block size of at least one of the one or more blocks of the video data;

adapt, based on the adaptation metric, application of an overlapped block motion compensation process to determine filtered predicted pixel values near the partition boundary for a first predicted block representative of the first partition of the video block, wherein to adapt application of the overlapped block motion compensation process, the one or more processors adjust a filter strength of a filter applied to predicted pixel values near the partition boundary for the first predicted block representative of the first partition of the video block, wherein to adapt, based on the adaptation metric, application of the overlapped block motion compensation process, the one or more processors are further configured to selectively disable application of the overlapped block motion compensation process when the determined block size is less than a block size threshold, wherein the overlapped block motion compensation process comprises a fetching operation for fetching a line of pixels from the memory, and wherein the determined block size comprises one of a video block size or a transform block size identifying a size of a transform applied to the first partition of the block; and output video data decoded using the adapted overlapped block motion compensation process.

41. The non-transitory computer-readable medium of claim 40, wherein the region of support comprises one of a frame in which the one or more blocks of the video data resides, a region of the frame in which the block of video data resides, the first partition, the second partition, and a transition region for either the first partition or the second partition that includes a portion of the pixels near the partition boundary in either the first partition or the second partition, a down-sampled version of the first partition, a down-sampled version of the second partition, and a down-sampled version of the transition region for either the first or the second partition.

42. The non-transitory computer-readable medium of claim 40, wherein the first partition is associated with a first motion vector referencing a first block of a first reference frame, wherein the second partition is associated with a second motion vector referencing a second block of a second reference frame, wherein the first predicted pixel value is predicted from the first motion vector, and wherein the second predicted pixel value is predicted form the second motion vector.

43. The non-transitory computer-readable medium of claim 40, wherein the instructions, when executed, cause the one or more processors to, when determining the adaptation metric based on a difference between a first predicted pixel value for the at least one pixel in the region of support and a second predicted pixel value for the at least one pixel in the region of support, determine the adaptation metric based on an absolute difference between first predicted pixel values for each pixel in the region of support and second predicted pixel values for each pixel in the region of support, wherein the first partition is associated with a first motion vector referencing a first block of a first reference frame, wherein the second partition is associated with a second motion vector referencing a second block of a second reference frame, wherein the first predicted pixel values are predicted from the first motion vector for each of the pixels in the region of support, and wherein the second predicted pixel values are predicted form the second motion vector for each of the pixels in the region of support.

44. The non-transitory computer-readable medium of claim 40, wherein the instructions, when executed, cause the one or more processors to, when determining the adaptation metric based on a difference between a first predicted pixel value for the at least one pixel in the region of support and a second predicted pixel value for the at least one pixel in the region of support, determine the adaptation metric based on an average pixel difference between first predicted pixel values for each pixel in the region of support and second predicted pixel values for each of the pixels in the region of support, wherein the first partition is associated with a first motion vector referencing a first block of a first reference frame, wherein the second partition is associated with a second motion vector referencing a second block of a second reference frame, wherein the first predicted pixel values are predicted from the first motion vector for each of the pixels in the region of support, and wherein the second predicted pixel value is predicted form the second motion vector for each of the pixels in the region of support.

45. The non-transitory computer-readable medium of claim 40, wherein the first partition is associated with a motion vector having a precision, wherein the instructions, when executed, cause the one or more processors to, when determining the adaptation metric, determine the adaptation metric based on the at least one pixel and the precision of the motion vector, wherein the instructions, when executed, cause the one or more processors to, when selectively disabling application of the overlapped block motion compensation process, selectively disable application of the overlapped block motion compensation process when the precision of the motion vector is less than a threshold precision, and wherein the threshold precision comprises one of integer precision, half pel precision, and quarter pel precision.

46. The non-transitory computer-readable medium of claim 40, wherein the first partition is associated with a prediction direction, wherein the instructions, when executed, cause the one or more processors to, when determining the adaptation metric, determine the adaptation metric based on the at least one pixel and the prediction direction, and wherein the instructions, when executed, cause the one or more processors to, when selectively disabling application of the overlapped block motion compensation process, selectively disable application of the overlapped block motion compensation process to the second partition when the prediction direction of the first partition is bi-directional.

* * * * *